United States Patent [19]
Mitsutake et al.

[11] Patent Number: 5,594,296
[45] Date of Patent: Jan. 14, 1997

[54] ELECTRON SOURCE AND ELECTRON BEAM APPARATUS

[75] Inventors: Hideaki Mitsutake, Yokohama; Naoto Nakamura, Isehara; Yoshihisa Sano, Atsugi, all of Japan

[73] Assignee: Canon Kabushiki Kaisha, Tokyo, Japan

[21] Appl. No.: 353,903

[22] Filed: Dec. 12, 1994

[30] Foreign Application Priority Data

Dec. 27, 1993 [JP] Japan .................................. 5-346990

[51] Int. Cl.$^6$ .............................. H01J 1/30; H01J 21/10; H01J 31/12
[52] U.S. Cl. ...................... 313/309; 313/336; 313/495; 313/496; 313/310
[58] Field of Search ............................ 313/309, 310, 313/336, 351, 346 R, 346 DC, 495, 496, 497

[56] References Cited

U.S. PATENT DOCUMENTS

| | | | |
|---|---|---|---|
| 4,155,028 | 5/1979 | Stolte | 315/14 |
| 4,954,744 | 9/1990 | Suzuki et al. | 313/336 |
| 5,063,323 | 11/1991 | Longo et al. | 313/309 |
| 5,066,883 | 11/1991 | Yoshioka et al. | 313/309 |
| 5,155,416 | 10/1992 | Suzuki et al. | 315/366 |
| 5,214,347 | 5/1993 | Gray | 313/355 |
| 5,247,223 | 9/1993 | Mori et al. | 313/309 |

FOREIGN PATENT DOCUMENTS

| | | | |
|---|---|---|---|
| 0312007 | 4/1989 | European Pat. Off. | H01J 1/30 |
| 0455162 | 11/1991 | European Pat. Off. | H01J 31/12 |
| 53-121454 | 10/1978 | Japan . | |
| 63-274047 | 11/1988 | Japan | H01J 37/073 |
| 1-031332 | 2/1989 | Japan | H01J 29/48 |
| 1100842 | 4/1989 | Japan . | |
| 1283750 | 11/1989 | Japan . | |
| 2-257551 | 10/1990 | Japan | H01J 31/15 |
| 4-73837 | 3/1992 | Japan . | |
| 473837 | 3/1992 | Japan | H01J 1/30 |

OTHER PUBLICATIONS

W. P. Dyke et al., "Field Emission", Advances in Electronics and Electron Physics, vol. VIII, 1956, pp. 90–182.
C. A. Spindt et al., "Physical Properties of Thin-Film Field Cathodes with Molybdenum Cones", Journal of Applied Physics, vol. 47, No. 12, Dec. 1976, pp. 5248–5263.
C. A. Mead, "Operation of Tunnel-Emission Devices", Journal of Applied Physics, vol. 32, No. 4, Apr. 1961, pp. 646–652.
M. I. Elinson et al., "The Emission of Hot Electrons and the Field Emission of Electrons From Thin Oxide", Radio Engineering and Electronic Physics, Jul. 1965, pp. 1290–1296.
G. Dittmer, "Electrical Conduction and Electron Emission of Discontinuous Thin Films", Thin Solid Films, 9 (1972), pp. 317–328.
M. Hartwell et al., "Strong Electron Emission From Patterned Tin-Indium Oxide Thin Films", IEEE Trans. ED Conf. (1975), pp. 519–521.
A. Araki et al., "Electroforming and Electron Emission of Carbon Thin Films", Journal of the Vacuum Society of Japan, vol. 26, No. 1, (1983), pp. 22–29, Abstract.

*Primary Examiner*—Nimeshkumar Patel
*Attorney, Agent, or Firm*—Fitzpatrick, Cella, Harper & Scinto

[57] ABSTRACT

An electron source or electron beam apparatus comprises an electron-emitting device and a shield member disposed above the electron-emitting device. The electron-emitting device generates an electric field component, when energized, that is parallel to a substrate surface on which the electron-emitting device is disposed, while the shield member has an aperture which allows electrons emitted from the electron-emitting device to pass therethrough, but blocks off charged particles flying toward the electron emitting device.

38 Claims, 24 Drawing Sheets

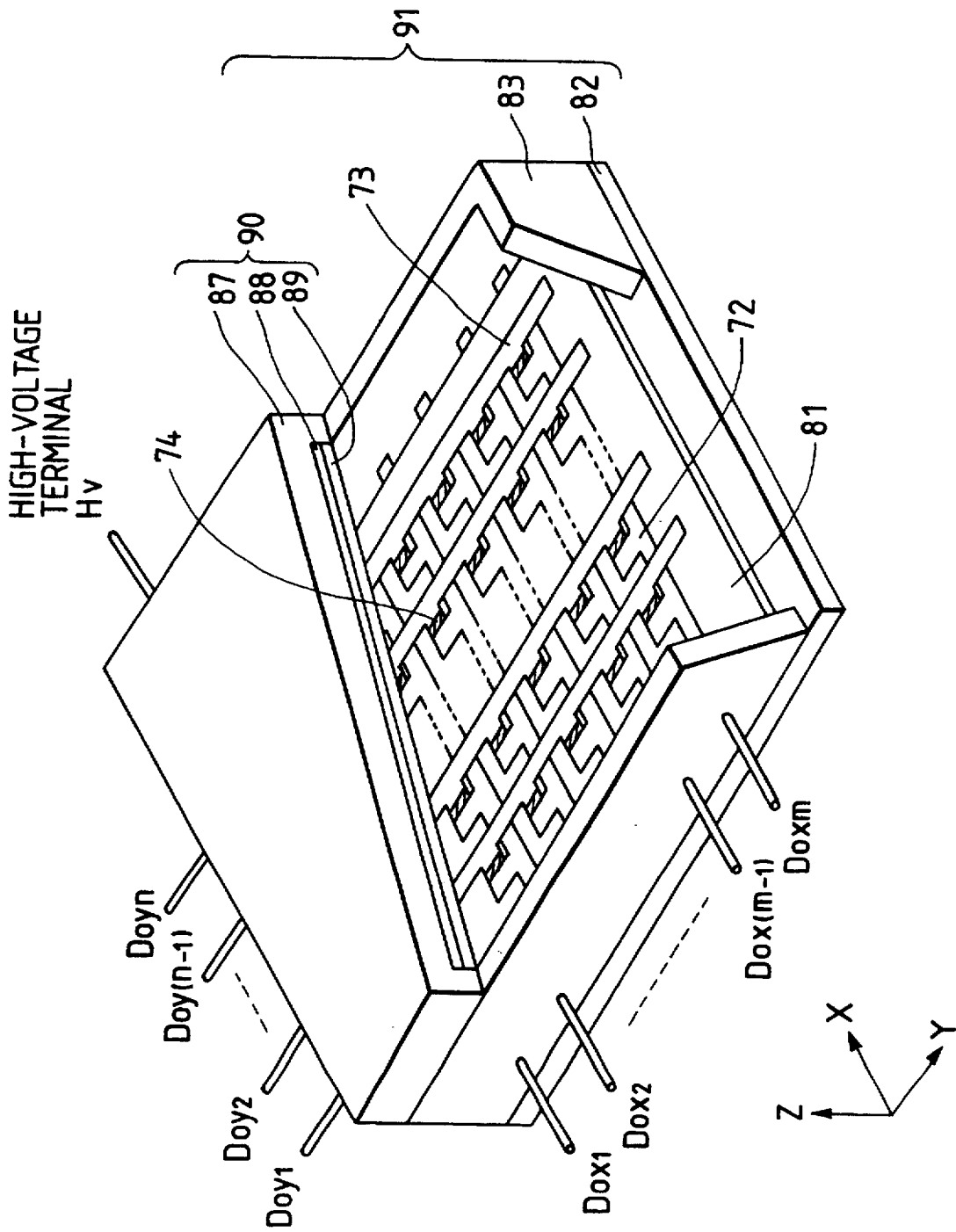

(STRIPE)

(MATRIX)

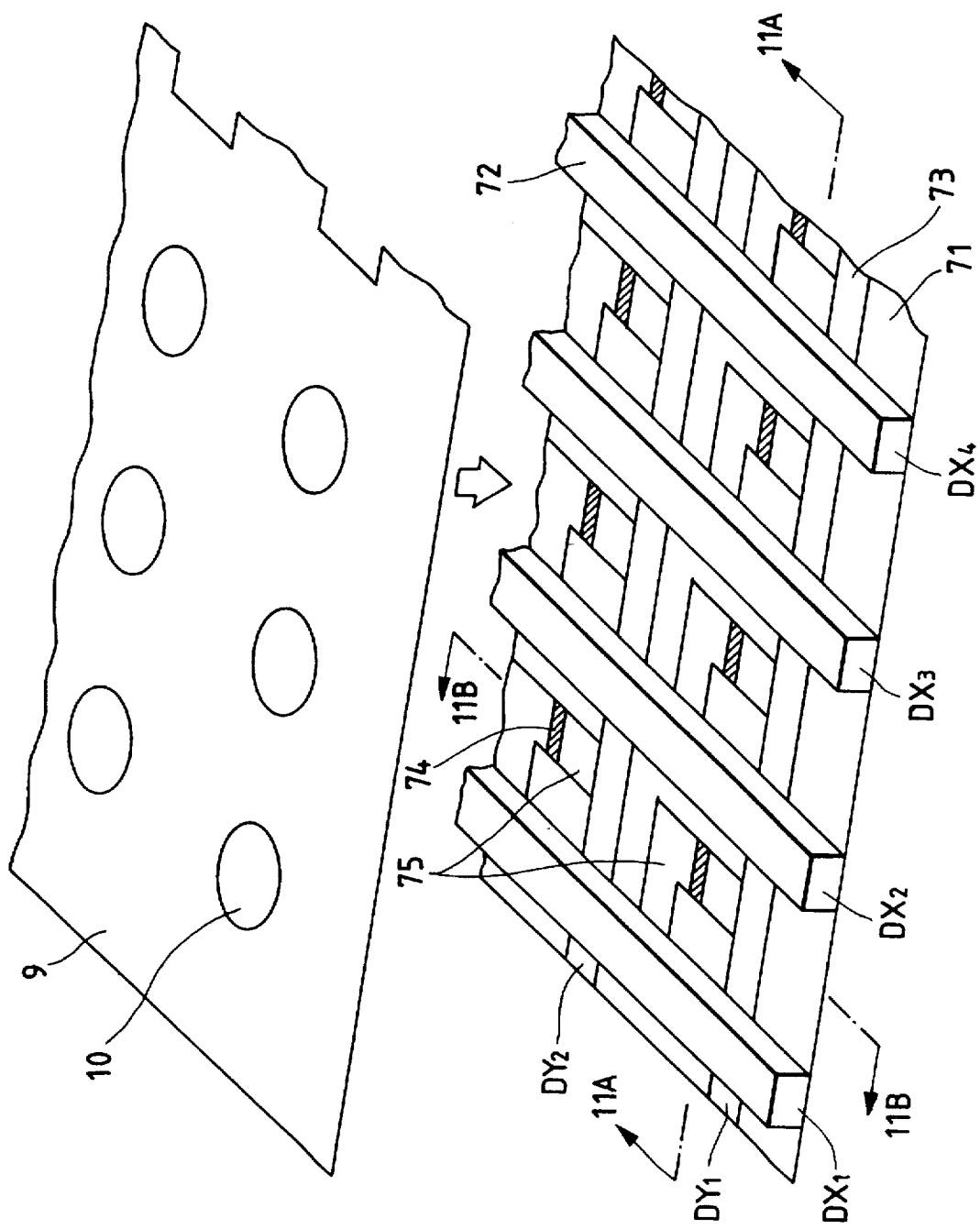

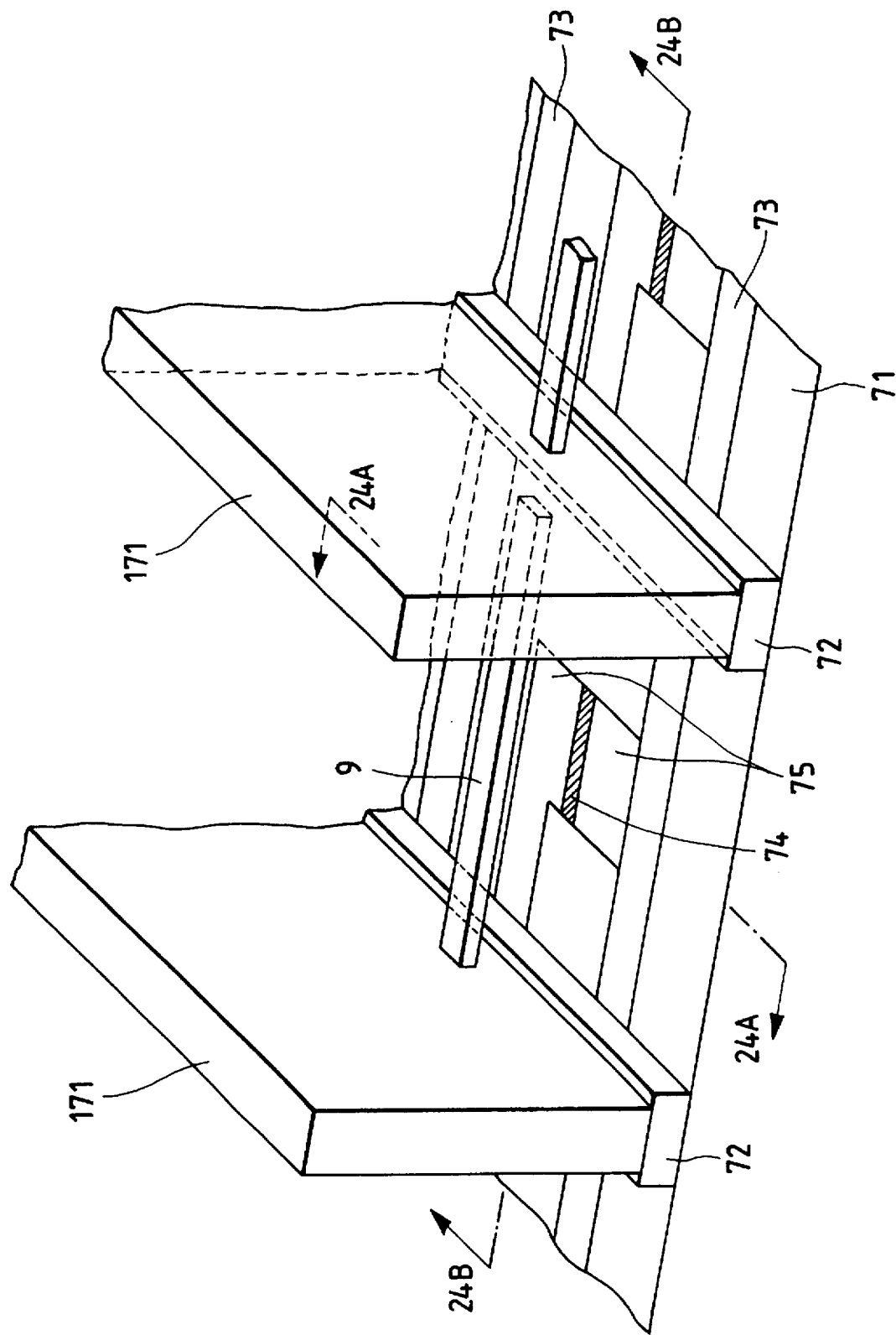

ELECTRON SOURCE AND ELECTRON BEAM APPARATUS

BACKGROUND OF THE INVENTION

1. Field of the Invention

The present invention relates to an electron source and an electron beam apparatus using the electron source.

2. Related Background Art

Generally, an image-forming apparatus utilizing electrons requires an enclosure for maintaining a vacuum atmosphere therein, an electron source for emitting electrons and a drive circuit for the electron source, an image-forming member such as a fluorescent substance which emits light upon impingement of electrons thereon, and an accelerating electrode and a high-voltage power supply for accelerating electrons toward the image-forming member. Some of image-forming apparatus using flat enclosures, such as thin-type image display devices, employs support posts (spacers) to provide a structure endurable against the atmospheric pressure.

In such an image-forming apparatus, when electrons are accelerated to fly in the enclosure, residual gas, etc. residing in the vacuum atmosphere and on the fluorescent substance are ionized and created positive ions are accelerated by the accelerating electrode to fly toward the electron source. If the positive ions impinge upon the electron source, particularly an electron-emitting device having an electron-emitting region, the electron source is deteriorated. Therefore, to prevent charged particles from directly impinging upon the electron-emitting device is important in achieving longer service life and higher reliability of the electron source.

As one expedient for preventing deterioration of the electron source due to the phenomenon described above, U.S. Pat. No. 4,155,028 discloses an electrostatic deflecting system. FIG. 27 shows a schematic construction of the disclosed system. Denoted by 3011 is an electron-emitting device comprising a hot cathode, 3012 is a first grid, 3013 is a second grid, and 3014 is an accelerating electrode. The first and second grids 3012, 3013 are arranged to extend at a certain angle defined therebetween, and are supplied with the same potential that is sufficient to draw electrons out of the electron-emitting device, but insufficient to create positive ions. Solid lines 3015 in FIG. 27 represent respective paths of electrons emitted from the electron-emitting device 3011. The electron paths are deflected near the second grid 3013 to advance toward the accelerating electrode 3014 perpendicularly. On the other hand, positive ions produced by the accelerating electrode 3014 have larger mass than electrons and hence are less deflected near the second grid 3013 to follow paths indicated by dotted lines 3016. Accordingly, the positive ions will not directly approach the electron-emitting device 3011. Thus, in U.S. Pat. No. 4,155,028, deterioration of the electron-emitting device is prevented by using a plurality of control electrodes which are arranged obliquely with respect to the electron-emitting device.

As electron-emitting devices for use in an electron source of an image-forming apparatus, there are also known cold cathode devices in addition to hot cathode devices as described above. Cold cathode devices include electron-emitting devices of field emission type (hereinafter abbreviated to FE), metal/insulating layer/metal type (hereinafter abbreviated to MIM), surface conduction type, etc.

Examples of FE electron-emitting devices are described in, e.g., W. P. Dyke 8 W. W. Dolan, "Field emission", Advance in Electron Physics, 8, 89 (1956) and C. A. Spindt, "Physical Properties of Thin-film Field Emission Cathodes with Molybdenum Cones", J. Appl. Phys., 47, 5248 (1976).

One example of MIM electron-emitting devices is described in, for example, C. A. Mead, "The tunnel-emission amplifier", J. Appl. Phys., 32, 646 (1961).

One example of surface conduction electron-emitting devices is described in, e.g., M. I. Elinson, Radio Eng. Electron Phys., 10, 1290 (1965).

A surface conduction electron-emitting device utilizes a phenomenon that when a thin film having a small area is formed on a substrate and a current is supplied to flow parallel to the film surface, electrons are emitted from the film. As to such a surface conduction electron-emitting device, there have been reported, for example, one using a thin film of $SnO_2$ by Elinson cited above, one using an Au thin film [G. Dittmer: "Thin Solid Films", 9, 317 (1972)], one using a thin film of $In_2O_3/SnO_2$ [M. Hartwell and C. G. Fonstad: "IEEE Trans. ED Conf.", 519 (1975)], and one using a carbon thin film [Hisashi Araki et. al.: "Vacuum", Vol. 26, No. 1, 22 (1983)].

As a typical configuration of those surface conduction electron-emitting devices, FIG. 28 shows the device configuration reported by M. Hartwell in the above-cited paper. In FIG. 28, denoted by reference numeral 3101 is an insulating substrate. 3102 is a thin film for forming an electron-emitting region which comprises, e.g., a metal oxide electroconductive thin film formed by sputtering into an H-shaped pattern. An electron-emitting region 3103 is formed by the energizing process called forming (described later).

In those surface conduction electron-emitting devices, it has heretofore been customary that, before starting emission of electrons, the electron-emitting region forming thin film 3102 is subjected to the energizing process called forming to form the electron-emitting region 3103. The term "forming" means a process of applying a voltage across the electron-emitting region forming thin film 3102 to locally destroy, deform or denature it to thereby form the electron-emitting region 3103 which has been transformed into an electrically high-resistance state. The electron-emitting region 3103 comprises a crack or the like formed in a portion of the electron-emitting region forming thin film 3102, and electrons are emitted from the vicinity of the crack. The electron-emitting region forming thin film 3102 including the electron-emitting region which has been formed by the forming process will be hereinafter referred to as an electron-emitting region including thin film 3104. In the surface conduction electron-emitting device after the forming process, a voltage is applied to the electron-emitting region including thin film 3104 to supply the device with a current, whereupon electrons are emitted from the electron-emitting region 3103.

As an example in which a number of surface conduction electron-emitting devices are formed into an array, there is an electron source wherein surface conduction electron-emitting devices are arranged side by side, both ends of the devices are interconnected by respective wirings in parallel to form one row of an array, and a number of rows are arranged to form the array (see, e.g., Japanese Patent Application Laid-open No. 64-31332 in the name of the same assignee).

Meanwhile, various image-forming apparatuses are constructed by combining an electron source which has an array of numerous surface conduction electron-emitting devices, with a fluorescent substance as an image-forming member which radiates visible light upon impingement of electrons emitted from the electron source (see, e.g., U.S. Pat No. 5,066,883 issued to the same assignee). This type of image-forming apparatus is expected to become popular and take the place of CRTs, because it is self-luminous (i.e., emission type), is relatively easy to manufacture with a large screen size, and has good display quality.

In an image-forming apparatus disclosed in Japanese Patent Application Laid-open No. 2-257551 in the name of the same assignee, for example, desired ones of surface conduction electron-emitting devices formed in a large number are selected by applying appropriate drive signals to wirings (i.e., row-directional wirings) each interconnecting the surface conduction electron-emitting devices in parallel which are arranged side by side, and to control electrodes (called grids) which are disposed in a space between an electron source and a fluorescent substance to extend in a direction (i.e., column-direction) perpendicular to the row-directional wirings.

SUMMARY OF THE INVENTION

To realize an image-forming apparatus using, particularly, cold cathode devices such as surface conduction electron-emitting devices with a simple construction, the inventors have studied a system wherein the surface conduction electron-emitting devices are properly interconnected by a plurality of row-directional wirings and a plurality of column-directional wirings to construct an electron source of simple matrix array in which the surface conduction electron-emitting devices are arranged to lie in the row-direction and the column-direction in a matrix pattern, and appropriate drive signals are applied to the row-directional wirings and the column-directional wirings so that desired ones of the surface conduction electron-emitting devices are selected and the amounts of electrons emitted therefrom are controlled.
(First Problem)

The above image-forming apparatus using the electron source of simple matrix array also has a possible risk that charged particles may collide against the electron source, particularly the electron-emitting region of the electron-emitting device, thereby deteriorating the electron source. There is another possible risk that because the electron source, particularly the electron-emitting region of the electron-emitting device, is directly exposed as viewed from the accelerating electrode, the electron source may be deteriorated if an accidental discharge occurs.
(Second Problem)

As a result of studying the above image-forming apparatus using the electron source of simple matrix array, the inventors found that the position of light emission on a fluorescent substance as an image-forming member (i.e., the position where electrons impinge upon the fluorescent substance) and the shape of light emitting portion were deviated from the design values. When using an image-forming member for a color image, in particular, a reduction in luminance and a color shift were also found in some cases along with the deviation in the position of light emission. It was further confirmed that the above phenomenon was caused near a support frame or support posts (spacers) disposed between the electron source and the image-forming member, or in peripheral edges of the image-forming member.

In view of the problems described above, an object of the present invention is to provide a novel image-forming apparatus using as electron-emitting devices, particularly, cold cathode devices such as surface conduction electron-emitting devices, which can easily control selection of desired devices and the amounts of electrons emitted from the selected devices with a simple construction, and can ensure long service life and high reliability without causing any deviation in the position of light emission.

As a result of intensive studies on the above two problems, the inventors found that the second problem, i.e., changes in the position and shape of light emitting portion, was also attributable to electrons emitted from the electron source.

More specifically, while the electrons emitted from the electron source impinge upon the fluorescent substance as the image-forming member, they also impinge upon residual gas in the vacuum with a low probability. It was found that part of scattered particles (such as ions, secondary electrons and neutral particles) produced upon the impingement with a certain probability collided against a portion in the image-forming apparatus where an insulating material is exposed, and the exposed portion was charged with electricity. It is then thought that such a charging gave rise to changes in the electric field near the exposed portion and hence a deviation of the electron path, which resulted in changes in the position and shape of light radiated from the fluorescent substance.

Observing the situations in which the position and shape of light radiated from the fluorescent substance are changed, it was further confirmed that positive charges were primarily accumulated in the above exposed portion. This fact is thought to be caused by deposition of positive ions among the scattered particles, or release of secondary electrons produced when the scattered particles impinge upon the above exposed portion.

The means for solving the problems described above and the operation of the means will be described below.

To achieve the above object, one aspect of the present invention resides in an electron source comprising an electron-emitting device and a shield member disposed above said electron-emitting device, said electron-emitting device generating an electric field component, when energized, that is parallel to a substrate surface on which said electron-emitting device is disposed, said shield member having an opening for allowing electrons emitted from said electron-emitting device to pass therethrough, but blocks off charged particles flying toward said electron emitting device.

Another aspect of the present invention resides in an electron beam apparatus comprising an electron-emitting device, a shield member disposed above said electron-emitting device and an irradiated member to which an electron beam emitted from said electron-emitting device is irradiated, said electron-emitting device generating an electric field component, when energized, that is parallel to a substrate surface on which said electron-emitting device is disposed, said shield member having an opening for allowing electrons emitted from said electron-emitting device to pass therethrough, but blocks off charged particles flying toward said electron emitting device.

According to the present invention, there can be provided an image-forming apparatus wherein the shield member is disposed between the electron source and the image-forming member within the image-forming apparatus to prevent particles (mainly positive ions), which are accelerated to fly from the side of the image-forming member toward the electron source, from depositing on or colliding against the electron source in the main, so that deterioration of the electron source and accumulation of undesired charges can be avoided. The above arrangement is also effective to prevent charges from accumulating on other portions than the electron source. To this end, it is only required to determine the shape and position of the shield member in such a manner as to cover insulating surfaces of the other portions such as support members (spacers) which are used to provide a structure endurable against the atmospheric pressure.

More specifically, the inventors have accomplished the optimum form of the present invention in view of that, in an electron-emitting device of the type that an electron-emitting region is formed between a pair of device electrodes disposed side by side on a substrate surface, such as a surface conduction electron-emitting device, the path of emitted electrons is deviated in the direction of an electric field developed by the pair of device electrodes with respect to the direction normal to the electron-emitting region because the electric field is generated parallel to the substrate surface, and that positive ions created in the image-forming apparatus are accelerated to fly substantially along an electric field which is developed by a high voltage applied between the electron source and the image-forming member and is vertical to these components.

In other words, with the image-forming apparatus of the present invention, since electrons emitted from the electron-emitting region of the electron-emitting device are forced to fly while deviating in the direction of an electric field developed by the pair of device electrodes with respect to the direction normal to the electron-emitting region, the electrons can travel toward the image-forming member formed of a fluorescent substance, for example, without being blocked off by a shield electrode as the shield member which covers the electron-emitting region from right above, and the electron-emitting region can be protected by the shield electrode against positive ions produced from the image-forming member. Also, even if there occurs an accidental discharge, deterioration of the electron source can be prevented. In the present invention, therefore, it is not required to additionally provide the grid, as shown in FIG. 27, for deflecting the electrons.

Accordingly, the feature of the present invention that does not require the additional complicated structure is especially suitable for an image-forming apparatus using an electron source of simple matrix array in which, as previously proposed by the applicant, pairs of opposite device electrodes of surface conduction electron-emitting devices, in particular, are properly interconnected by a plurality of row-directional wirings and a plurality of column-directional wirings so that the surface conduction electron-emitting devices are arranged to lie in the row-direction and the column-direction in a matrix pattern.

The present invention is also applicable to any types of cold cathode devices other than surface conduction electron-emitting devices, in which the path of electrons is deviated from the direction right above or perpendicular to the electron-emitting device. One example of such other electron-emitting devices is a field-effect electron-emitting device having a pair of opposite electrodes formed on the surface of a substrate where an electron source is to be made up, as disclosed in Japanese Patent Application Laid-open No. 63-274047 filed by the assignee.

The present invention is further applicable to image-forming apparatus using electrons sources of other than simple matrix array. One example of such image-forming apparatus is obtained by modifying an image-forming apparatus in which desired ones of surface conduction electron-emitting devices are selected by using control electrodes as disclosed in Japanese Patent Application Laid-open No. 2-257551 filed by the assignee, such that the shield electrode of the present invention is added on the same side as an electron source having the surface conduction electron-emitting devices or as a face plate having a fluorescent substrate as viewed from the control electrode.

According to the spirit of the present invention, the invention is not limited to image-forming apparatus suitable for display, but may be applied to an optical printer, which comprises a photosensitive drum, light-emitting diodes and so on, as a light-emitting source in place of the light-emitting diodes. In this case, the image-forming apparatus can be employed as not only a linear light-emitting source, but also a two-dimensional light-emitting source by properly selecting a number m of row-directional wirings and a number n of column-directional wirings.

In addition, according to the spirit of the present invention, the invention is further applicable to the case where the irradiated member to which electrons emitted from the electron source are irradiated is one other than the image-forming member, such as represented by an electron microscope, for example. Thus, the present invention can also be practiced in the form of an electron beam generator without specifying a type of the irradiated member.

BRIEF DESCRIPTION OF THE DRAWINGS

FIG. 7 is a perspective view, partly broken away, showing one example of construction of an image-forming apparatus of the present invention.

FIG. 10 is a partial perspective view of an electron source shown as Example 1.

FIG. 22 is a partial perspective view of an electron source shown as Example 5.

DETAILED DESCRIPTION OF THE PREFERRED EMBODIMENTS

The present invention is directed to an electron source, an electron beam generator and an image-forming apparatus using the aforementioned cold cathode devices. In particular, surface conduction electron-emitting devices are preferably used as cold cathode devices.

In FE devices, it is needed to control precisely the shape of the tip of an electron emitting portion. This necessity will increase the production cost of a device or make it difficult to manufacture a large area apparatus due to limitations in the production process. On the other hand, surface conduction electron emitting devices have a simple structure and therefore, even a large area apparatus can be easily manufactured. Thus, they are suitable as cold cathode devices particularly in recent years when inexpensive, large screen display devices are highly desired.

Further, surface conduction electron emitting devices can be driven by application of lower voltages (20 V or lower) than FE devices (about 100 V), which is desirable in the present invention. Because, as the driving voltage becomes higher, the electric field formed by the device electrodes becomes stronger and the deviation of electron orbitals from the vertical direction of the device is enlarged as follows:

$$\delta = 2d \sqrt{(V_f/V_v)}$$

$\delta$: deviation;

d: height from device to opening;

$V_f$: device-driving voltage;

$V_v$: potential difference between opening

Thus, the opening position of the shield member as in Example 1 described later will be considerably apart from the position of the electron emitting device. In the case that a plurality of electron emitting devices are provided in parallel, devices must be provided with a longer interval and it would be difficult to realize a higher density arrangement of devices.

Further, the inventors have also found out that it is preferable for having good characteristics and realizing a large screen to form the electron-emitting region or the region surrounding it of the surface condition electron-emitting device from a fine particle film.

Accordingly, in the following description as to the embodiments and examples of the present invention, image-forming apparatuses having as a multi-electron-beam source surface conduction electron-emitting devices formed by using a fine particle film are described as preferred examples of the image-forming apparatus of the present invention.

Figure 1A:
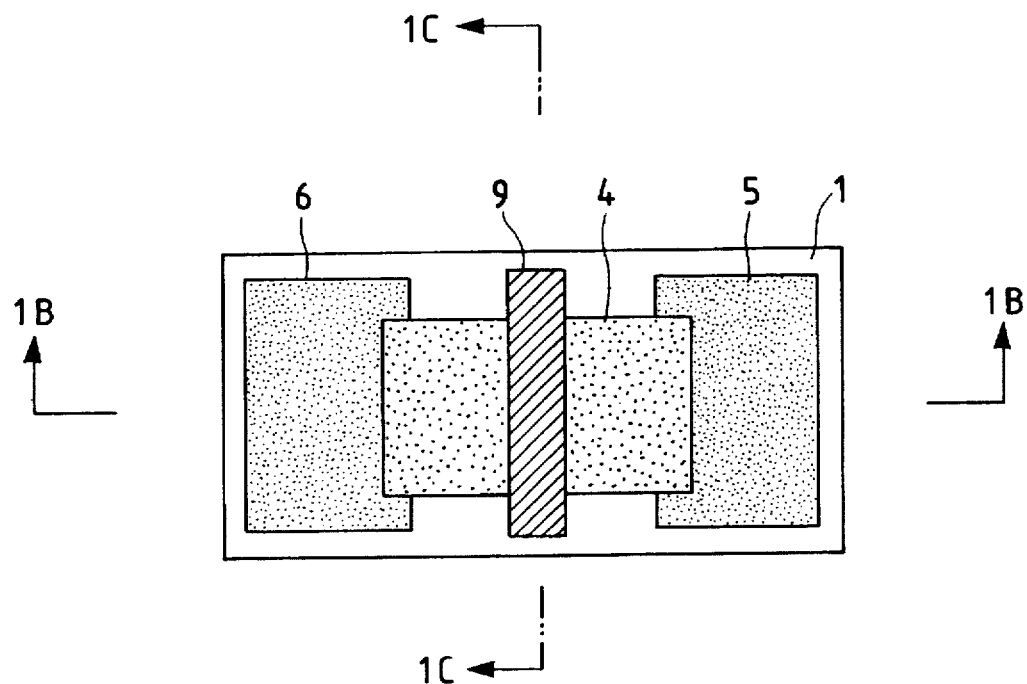
FIGS. 1A through 1C are basic schematic views showing one example of an electron source according to the present invention.
Figure 1B:
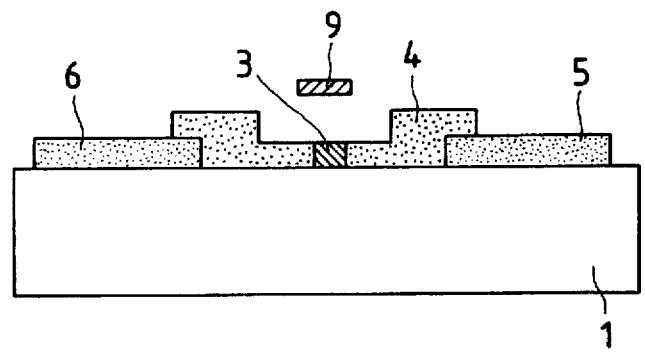
Figure 1C:
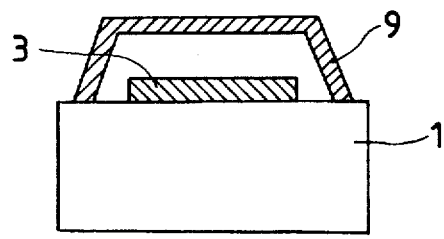
Figure 2A:
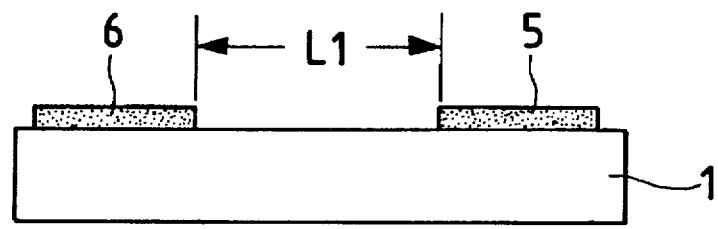
FIGS. 2A through 2D are views of successive steps for explaining a manufacture method of the electronsource shown in FIG. 1.
Figure 2B:
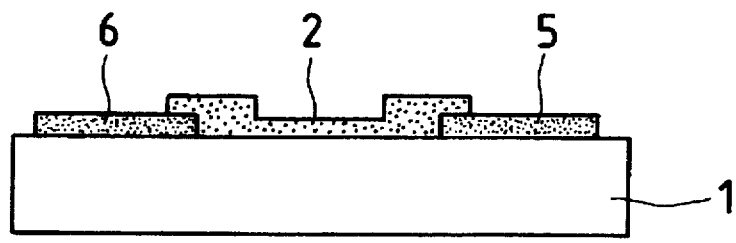
Figure 2C:
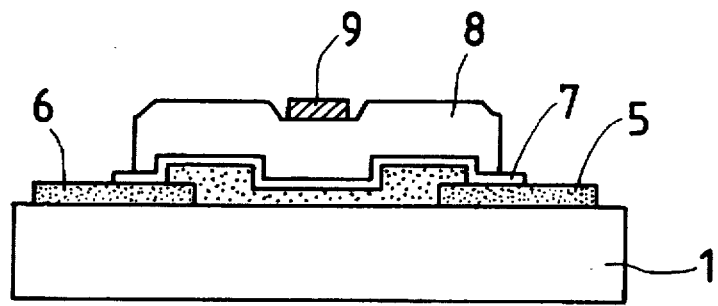
Figure 2D:
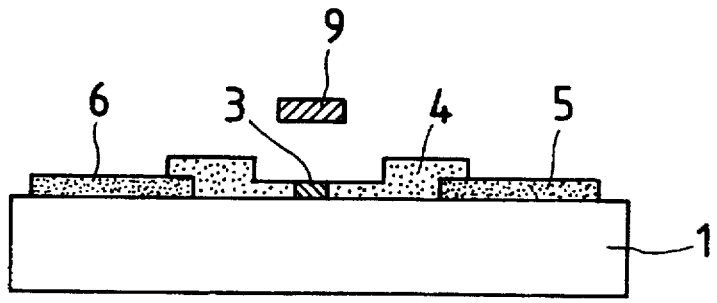

First, one example of construction of an electron source according to the present invention is shown in FIGS. 1A through 1C in which: FIG. 1A is a plan view and FIGS. 1B and 1C are sectional views. In these drawings, denoted by reference numeral 1 is a substrate, 5 and 6 are device electrodes, 4 is a conductive film including an electron-emitting region, 3 is an electron-emitting region, and 9 is a shield member covering the electron-emitting region from right above. Thus FIGS. 1A to 1C show an example of the electron source wherein a surface conduction electron-emitting device, which has the conductive film 4 including the electron-emitting region 3 between the device electrodes 5 and 6 disposed side by side on the substrate 1, and the shield member 9 are arranged in a unitary structure.

One example of a manufacture method of the electron source shown in FIGS. 1A to 1C will be described below with reference to FIGS. 2A through 2D (sectional view taken along line 1B—1B in FIG. 1A) that show successive manufacture steps. The following steps a through d correspond respectively to FIGS. 2A through 2D.

Step a: The substrate 1 is sufficiently washed with a detergent, pure water and an organic solvent. A device electrode material is then deposited on the substrate 1 by vacuum evaporation, sputtering or any other suitable method. The device electrodes 5, 6 are then formed on the surface of the substrate 1 by the photolithography technique.

The substrate 1 may be of, for example, a glass substrate made of, e.g., quartz glass, glass having a reduced content of impurities such as Na, soda lime glass and soda lime glass having $SiO_2$ laminated thereon by sputtering, or a ceramic substrate made of, e.g., alumina.

The device electrodes 5, 6 may be made of any material which has conductivity. Examples of electrode materials are metals such as Ni, Cr, Au, Mo, W, Pt, Ti, Al, Cu and Pd or alloys thereof, printed conductors comprising metals such as Pd, Ag, Au, $RuO_2$ and Pd-Ag or oxides thereof, glass, etc., transparent conductors such as $In_2O_3$—$SnO_2$, and semiconductors such as polysilicon.

Step b: Between the device electrodes 5 and 6 provided on the substrate 1, an organic metal thin film is formed by coating an organic metal solution over the substrate. After that, the organic metal thin film is heated for baking and then patterned by lift-off or etching to thereby form an electron-emitting region forming thin film 2.

The organic metal solution is a solution of an organic compound containing, as a primary element, any of the above-cited metals such as Pd, Ru, Ag, Au, Ti, In, Cu, Cr, Fe, Zn, Sn, Ta, W and Pb.

While the organic metal thin film is formed herein by coating the organic metal solution, the forming method is not limited to the coating, and the organic metal thin film may be formed by any of other methods such as vacuum evaporation, sputtering, chemical vapor-phase deposition, dispersion coating, dipping and spinning.

Step c: A protective layer 7 for the electron-emitting region forming thin film 2 is formed of Cr. Thereafter, a sacrifice layer 8 and a shield member 9 are successively laminated thereon. At this time, the sacrifice layer 8 and the shield member 9 are selected in size and configuration so that the shield member 9 has opposite ends formed to reach the substrate 1. The shield member 9 is preferably conductive and made of a metal, e.g., Al, in the form of a thin film.

Step d: The sacrifice layer 8 is etched away to form a gap between the thin film 2 and the shield member 9. The protective layer 7 serving to protect the thin film 2 during the etching is then removed. Finally, the energizing process called forming is carried out by applying a voltage between the device electrode 5 and 6 from a power supply (not shown). The electron-emitting region forming thin film 2 is thereby locally changed in its structure so as to form the electron-emitting region 3. Note that the electron-emitting region 3 formed as described above comprises conductive fine particles in some cases.

Practical examples of materials of the conductive film 4 including the electron-emitting region are metals such as Pd, Ru, Ag, Au, Ti, In, Cu, Cr, Fe, Zn, Sn, Ta, W and Pb, oxides such as PdO, $SnO_2$, $In_2O_3$, PbO, $Sb_2O_3$, borides such as $HfB_2$, $ZrB_2$, $LAB_6$, $CeB_6$, $YB_4$ and $GdB_4$, carbides such as TiC, ZrC, HfC, TaC, SiC and WC, nitrides such as TiN, ZrN and HfN, semiconductors such as Si and Ge, and carbon. The conductive film 4 is basically of a fine particle film.

In the electron source manufactured through the above steps, electrons are emitted from the electron-emitting region 3 by applying a voltage to the conductive film 4 including the electron-emitting region so that a current flows along the device surface. Because of a horizontal electric field established by the device electrodes 5, 6 in the vicinity of the electron-emitting region 3, the emitted electrons are forced to fly following the path deviated from the direction right above or perpendicular to the electron-emitting region 3. Therefore, the electrons are not blocked off by the shield member 9 which is disposed to cover the electron-emitting region 3 from right above. In this connection, it is desired that the shield member 9 be associated with voltage applying means to regulate a potential of the shield member.

The method of manufacturing the electron source of the present invention is not limited to the above-described one, but part of the foregoing manufacture process may be modified as needed.

A method of evaluating the electron source of the present invention will now be described with reference to FIG. 4.

Figure 4:
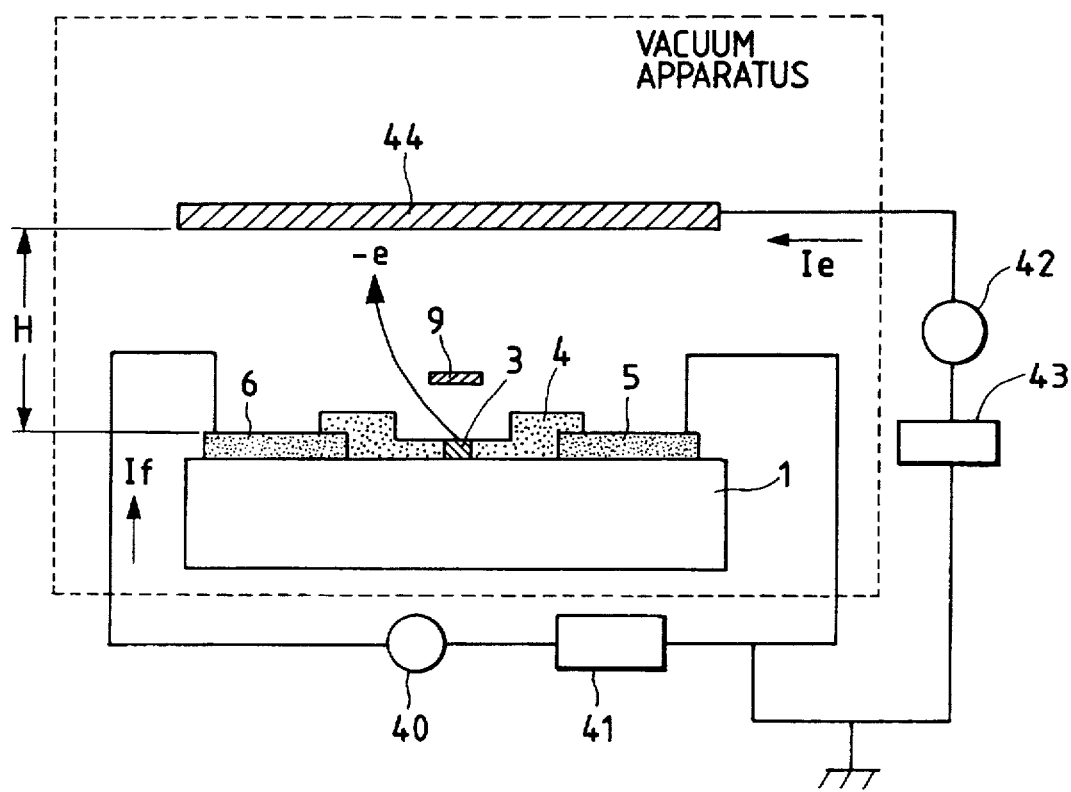
FIG. 4 is a schematic view showing an outline of an apparatus for measuring and evaluating electron emitting characteristics of an electron-emitting device.

FIG. 4 is a schematic view of a measuring/evaluating apparatus for measuring electron emission characteristics of the electron source constructed as shown in FIGS. 1A through 1C. In FIG. 4, denoted by 1 is a substrate, 5 and 6 are device electrodes, 4 is a conductive film including an electron-emitting region, 3 is an electron-emitting region, and 9 is a shield member. Further, 41 is a power supply for applying a device voltage Vf to the electron source, 40 is an ammeter for measuring a device current If flowing through the electron-emitting region including conductive film 4 between the device electrodes 5 and 6, 44 is an anode electrode for capturing an emission current Ie emitted from the electron-emitting region 3 of the electron source, 43 is a high-voltage power supply for applying a voltage to the anode electrode 44, and 42 is an ammeter for measuring the emission current Ie emitted from the electron-emitting region 3 of the electron source. For measuring the device current If and the emission current Ie of the electron source, the power supply 41 and the ammeter 40 are connected to the device electrodes 5, 6, and the anode electrode 44 connected to the power supply 43 and the ammeter 42 is disposed above the electron source. The electron source and the anode electrode 44 are disposed in a vacuum apparatus which is associated with additional necessary units (not shown) such as an evacuation pump and a vacuum gauge, so that the electron source is measured and evaluated under a desired degree of vacuum.

The measurement was performed by setting the voltage applied to the anode electrode to be in the range of 1 kV to 10 kV, and the distance H between the anode electrode and the electron-emitting device to be in the range of 2 mm to 8 mm.

Figure 5:
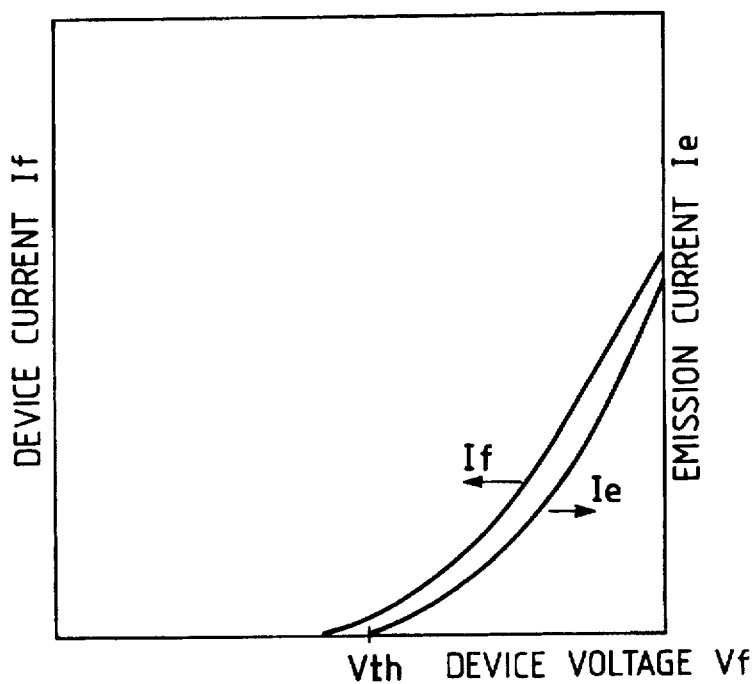
FIG. 5 is a graph showing current versus voltage characteristics of the electron-emitting device.

FIG. 5 shows typical examples of the relationships of the emission current Ie and the device current If versus the device voltage Vf measured by the measuring/evaluating apparatus shown in FIG. 4. Note that the graph of FIG. 5 is plotted in arbitrary units because values of If and Ie are much different from each other.

Next, an electron beam generator and an image-forming apparatus of the present invention will be described below.

Figure 6:
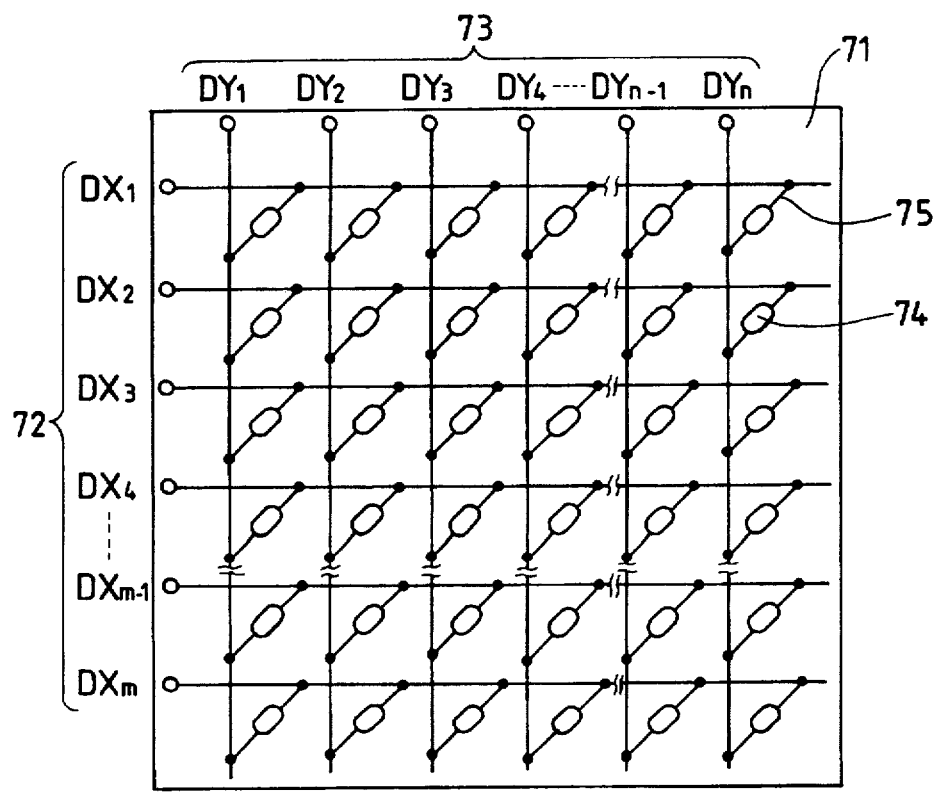
FIG. 6 is a schematic view of an electron source in which a number of electron-emitting devices are arranged and connected in a simple matrix wired pattern.

FIG. 6 is a schematic view of an electron source in which a number of electron-emitting devices 74 are arranged and connected in a simple matrix wired pattern. In FIG. 6, denoted by 71 is a substrate formed of a glass substrate or the like. The size and thickness of the substrate 71 are appropriately set depending on, for example, the number of electron-emitting devices to be arrayed on the substrate 71, the shape of each device in design, and conditions for maintaining a vacuum in an enclosure when the substrate constitutes part of the enclosure in use of the electron source. Note that while shield members as the main feature of the present invention are not shown in FIGS. 6 and 7 (described later) for convenience of the drawing, each of the electron-emitting devices 74 includes the above-described shield member as shown in FIGS. 1A through 1C.

Then, m lines of X-directional wirings 72, indicated by $DX_1, DX_2, \ldots, DX_m$, are made of, e.g., a conductive metal and are formed in a desired pattern on the substrate 71 by vacuum evaporation, printing, sputtering or the like. The material, film thickness and width of the wirings 72 are selected so that a voltage as uniform as possible is supplied to all of the numerous electron-emitting devices. Also, n lines of Y-directional wirings 73, indicated by $DY_1, DY_2, \ldots, DY_n$, are made of, e.g., a conductive metal and are formed in a desired pattern on the substrate 71 by vacuum evaporation, printing, sputtering or the like, as with the X-directional wirings 72. The material, film thickness and width of the wirings 73 are also selected so that a voltage as uniform as possible is supplied to all of the numerous electron-emitting devices. An interlayer insulating layer (not shown) is interposed between the m lines of X-directional wirings 72 and the n lines of Y-directional wirings 73 to electrically isolate the wirings 72, 73 from each other, thereby making up a matrix wired pattern. Note that m, n are each a positive integer. The not-shown interlayer insulating layer is made of, e.g., $SiO_2$ which is formed by vacuum evaporation, printing, sputtering or the like into a desired shape so as to cover the entire or partial surface of the substrate 71 on which the X-directional wirings 72 have been formed. The thickness, material and fabrication process of the interlayer insulating layer is appropriately selected so as to endure the potential difference in portions where the m lines of X-directional wirings 72 and the n lines of Y-directional wirings 73 are crossed each other.

Further, opposite electrodes (not shown in FIG. 6, but corresponding to the above-described members 5, 6 shown in FIGS. 1A to 1C) of the electron-emitting devices 74 are electrically connected to the m lines of X-directional wirings 72 and the n lines of Y-directional wirings 73 by respective connecting leads 75 which are made of, e.g., a conductive metal and formed by vacuum evaporation, printing, sputtering or the like.

The X-directional wirings 72 are electrically connected to scan signal generating means (not shown) for applying a scan signal to optionally scan rows of the electron-emitting devices 74 which are arrayed in the X-direction per row. On the other hand, the Y-directional wirings 73 are electrically connected to modulation signal generating means (not shown) for applying a modulation signal to optionally modulate columns of the electron-emitting devices 74 which are arrayed in the Y-direction per column. Additionally, a driving voltage applied to each of the electron-emitting devices is supplied as a differential voltage between the scan signal and the modulation signal both applied to that device.

Figure 8A:
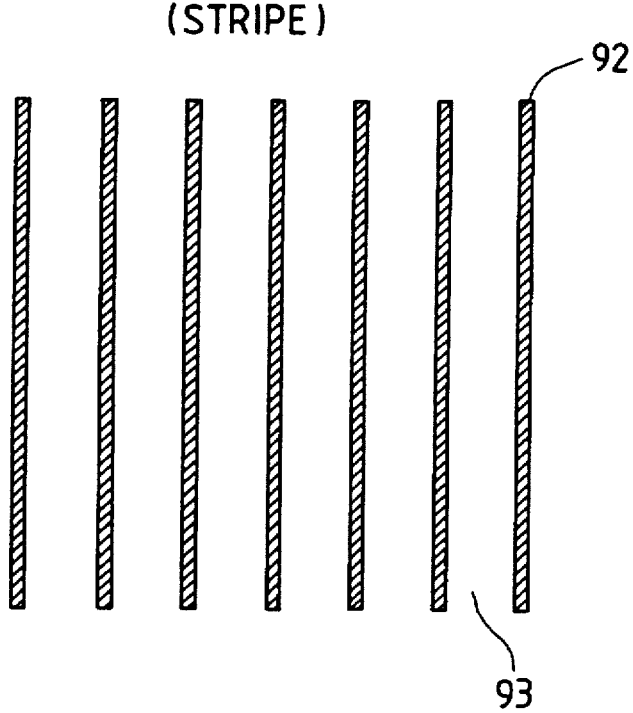
FIGS. 8A and 8B are views showing examples of configuration of a fluorescent film in the image-forming apparatus.
Figure 8B:
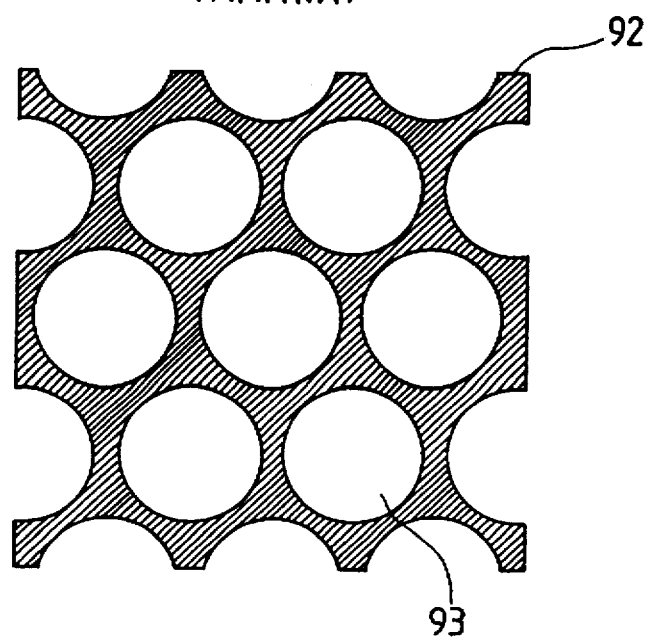

As one application of the electron beam generator using the electron source shown in FIG. 6, an image-forming apparatus in which an image-forming member is employed as a member irradiated by electrons will be described below with reference to FIGS. 7, 8A and 8B. FIG. 7 shows a basic structure of the image-forming apparatus and FIGS. 8A and 8B show patterns of a fluorescent film used in the image-forming apparatus. In FIG. 7, denoted by 81 is an electron source constructed as shown in FIG. 6, 82 is a rear plate to which the electron source 81 is fixed, 90 is a face plate fabricated by laminating a fluorescent film 88 and a metal back 89 on an inner surface of a glass substrate 87, and 83 is a support frame. The rear plate 82 and the face plate 90 are joined to the support frame 83 in a hermetically sealed manner by using frit glass or the like to thereby make up an enclosure 91.

In the illustrated embodiment, the enclosure 91 is made up by the face plate 90, the support frame 83 and the rear plate 82 as described above. However, since the rear plate 82 is provided for the purpose of mainly reinforcing the strength of the electron source 81, the separate rear plate 82 can be dispensed with when the electron source 81 itself has a sufficient degree of strength. In this case, the support frame 83 may be directly joined to the electron source 81 in a hermetically sealed manner, thereby making up the enclosure 91 by the face plate 90, the support frame 83 and the electron source 81.

The fluorescent film 88 comprises only a fluorescent substance in the monochrome case, but in the case of producing a color image, the fluorescent film is formed by a combination of black conductors 92 and fluorescent substances 93, the black conductors being called black stripes or a black matrix depending on the manner in which the fluorescent substances are arranged between the black conductors as shown in FIGS. 8A and 8B. The provision of the black stripes or the black matrix is to make black the gaps between the fluorescent substances 93 for three primary colors which are required in color display, so that color mixing becomes less conspicuous and a reduction in contrast caused by reflection of exterior light by the fluorescent film 88 is suppressed. Materials of the black stripes are not limited to a material containing graphite as a primary component which is usually employed in the art, but may be of any other material so long as it is conductive and has small values of transmissivity and reflectivity of light.

Fluorescent substances are coated on the glass substrate 87 by the precipitation or printing method regardless of whether the image is monochrome or colored.

On the inner surface of the fluorescent film 88, the metal back 89 is usually disposed. The metal back 89 has functions of increasing the luminance by mirror-reflecting light, that is emitted from the fluorescent substance to the inner side, toward the face plate 90, serving as an electrode to apply a voltage for accelerating an electron beam, and protecting the fluorescent substance from being damaged by collisions with negative ions produced in the enclosure. The metal back can be fabricated, after forming the fluorescent film, by smoothing the inner surface of the fluorescent film (this step being usually called filming) and then depositing Al thereon by vacuum evaporation, for example. To increase conductivity of the fluorescent film 88, the face plate 90 may include a transparent electrode (not shown) disposed on an outer surface of the fluorescent film 88 in some cases.

Before the above hermetic sealing, alignment of the parts with due care is required in the case of color display since the fluorescent substances in respective colors and the electron-emitting devices must be precisely positioned corresponding to each other.

The enclosure 91 is evacuated through an evacuation tube (not shown) to create a vacuum at a degree of about $10^{-6}$ Torr, and is then hermetically sealed.

Additionally, to maintain a vacuum degree in the enclosure 91 after hermetically sealing it, the enclosure may be subjected to gettering. This process is performed by, immediately before or after the sealing, heating a getter disposed in a predetermined position (not shown) in the enclosure 91 with resistance heating or high-frequency heating so as to form an evaporation film of the getter. The getter usually contains Ba as a primary component. The interior of the enclosure 91 can be maintained at a vacuum degree in the range of $1\times10^{-5}$ to $1\times10^{-7}$ Torr by the adsorbing action of the evaporation film.

In the image-forming apparatus of the present invention thus completed, voltages are applied to desired ones of the electron-emitting devices through terminate Dox1 to Doxm and Doy1 to Doyn extending outwardly of the enclosure, thereby emitting electrons therefrom. Simultaneously, a high voltage of several kV or more is applied to the metal back 89 or the transparent electrode (not shown) through a high-voltage terminal Hv so that electron beams are accelerated to impinge upon the fluorescent film 88, whereby the fluorescent substances are excited to radiate lights for displaying an image. Positive ions produced near the face plate 90 at this time are forced to fly following the path along a Z-directional electric field established by the applied high voltage. Thus, the positive ions flying toward each electron-emitting region of the electron-emitting device 74 can be blocked off by the shield member 9 provided for each of the electron-emitting devices as shown in FIGS. 1A through 1C.

Generally, the voltage applied between the pair of device electrodes of the electron-emitting device is in the range of 12 to 16 V, the distance between the metal back or the transparent electrode and the electron-emitting device is in the range of 2 to 8 mm, and the high voltage applied between the metal back or the transparent electrode and the electron-emitting device is in the range of 1 to 10 kV. Preferably, the shield member 9 is disposed nearer to the electron-emitting device and its potential is set to be substantially equal to the potential developed at the position of the shield member when the shield member is not provided. However, even if the potential of the shield member is out of the above condition, the advantage of the present invention is not lost so long as the emitted electrons are not blocked off by the shield member. Also, insofar as the shield member 9 will not block off the emitted electrons, it may be disposed to cover not only the area right above the electron-emitting region, but also part or the whole of the areas right above the electron-emitting region including conductive film 4 and the device electrodes 5, 6.

The above-described arrangement is a minimum outline necessary to manufacture the image-forming apparatus suitable for image display and other purposes. Details of the apparatus, e.g., materials and locations of the components, are not limited to those described above, but may be selected, as desired, to be fit for the application of the image-forming apparatus.

EXAMPLES

The present invention will be described below in more detail in connection with Examples.

Example 1

Figure 11A:
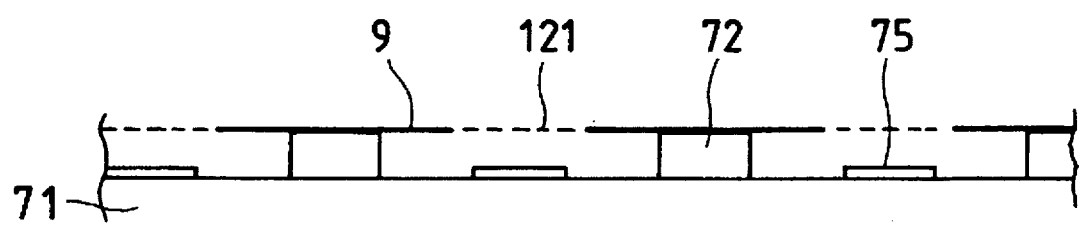
FIGS. 11A and 11B are partial sectional views of the electron source.
Figure 11B:
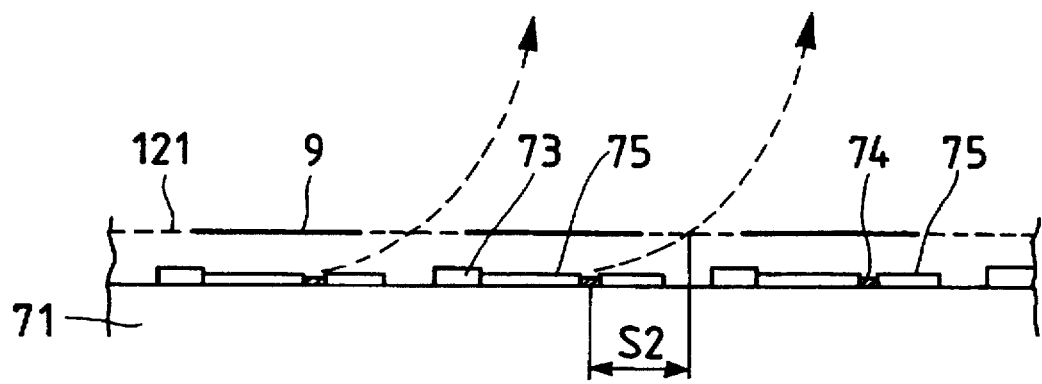

FIG. 10 shows a schematic partial perspective view of an electron source of this Example. Sectional views taken respectively along lines 11A—11A and 11B—11B in FIG. 10 are shown in FIGS. 11A and 11B. Note that, in FIGS. 6, 10, 11A and 11B, the same reference numerals denote identical members. Referring to the drawings, denoted by 71 is an insulating substrate, 73 is a Y-directional wiring formed in a predetermined pattern on the insulating substrate 71, 72 is an X-directional wiring which had a film thickness of 50 μm and was formed by, e.g., printing on the Y-directional wiring 73 with an interlayer insulating layer (not shown) therebetween, and 74 is an electron-emitting device.

The electron-emitting device 74 was of a surface conduction electron-emitting device which had the conductive film 4 including the electron-emitting region 3 between the device electrodes 5 and 6 disposed side by side, as described above with reference to FIGS. 1A through 1C. A number of electron-emitting devices 74 were electrically connected, as shown in FIG. 10, to the X-directional wirings 72 and the Y-directional wirings 73 by connecting leads 75.

Further, denoted by 9 is a shield member which was formed of a conductive thin plate (of, e.g., Al) and was disposed on the X-directional wirings 72 with an insulating layer (not shown) therebetween. The shield member 9 had electron passage holes 10 formed therein so as to cover the areas right above the electron-emitting devices 74, but not to interfere with the paths of electrons emitted from the electron-emitting regions of the electron-emitting devices. Specifically, the electron passage holes 10 formed in the shield member 9 were each circular with a radius of 30 μm and had the center at a position deviated 40 μm (indicated by S2 in FIG. 11B) from the position right above the corresponding electron-emitting region.

The manufacture process of the electron source of this Example will be briefly described in the order of successive steps.

1) A silicon oxide film being 0.5 μm thick was formed on a cleaned soda lime glass, as the substrate 71, by sputtering. A Cr film being 50 Å thick and an Au film being 6000 Å thick were then laminated on the substrate 71 in this order by vacuum evaporation. A photoresist (AZ1370, by Hoechst Co.) was coated thereon under rotation by using a spinner and then baked. Thereafter, by exposing and developing a photomask image, a resist pattern for the Y-directional wirings 73 was formed. The deposited Au/Cr films were selectively removed by wet etching to thereby form the Y-directional wirings 73 in a desired pattern.

2) Then, the interlayer insulating layer (not shown) formed of a silicon oxide film being 1.0 μm thick was deposited over the substrate by RF sputtering.

3) A photoresist pattern for forming contact holes (not shown) in the above silicon oxide film for electrical connection between the Y-directional wirings 73 and the device electrodes was coated thereon and, by using it as a mask, the interlayer insulating layer was selectively etched to form the contact holes. The etching was carried out by the RIE (Reactive Ion Etching) process using a gas mixture of $CF_4$ and $H_2$.

4) A photoresist (RD-2000N-41, by Hitachi Chemical Co., Ltd.) was formed in a pattern to define the device electrodes 5, 6 and the gaps therebetween. A Ti film being 50 Å thick and an Ni film being 1000 Å thick were then deposited thereon in this order by vacuum evaporation. The photoresist pattern was dissolved in an organic solvent to leave the deposited Ni/Ti films by lift-off, whereby the device electrodes 5, 6 were formed.

5) The X-directional wirings 72 of silver were formed in a desired pattern with a thickness of 50 μm by screen printing.

6) By using a mask formed with openings each covering the gap between the device electrodes and the vicinity thereof, a Cr film being 1000 Å thick was deposited by vacuum evaporation and patterned. Organic Pd (ccp-4230, by Okuno Pharmaceutical Co., Ltd.) was coated thereon under rotation by using a spinner and then heated for baking at 300° C. for 10 minutes. An electron-emitting region forming thin film comprising fine particles of Pd as a primary constituent element was thus formed.

7) The Cr film and the electron-emitting region forming thin film after the baking were etched by an acid etchant to provide the electron-emitting region forming thin film in a desired pattern.

8) A resist was coated over the entire surface, exposed by using a mask, and then developed to form a resist pattern in which the resist was removed in only the areas corresponding to the contact holes. A Ti film being 50 Å thick and an Au film being 5000 Å thick were then deposited thereon in this order by vacuum evaporation. The unnecessary deposits on the resist pattern was removed to leave the contact holes filled with the deposits by lift-off.

As a result of the above steps, the Y-directional wirings 73, the interlayer insulating layer (not shown), the X-directional wirings 72, the device electrodes 5, 6, the electron-emitting region forming thin films, etc. were formed on the insulating substrate 71 to provide the electron source not yet subjected to the forming process.

Subsequently, the shield member 9 formed of a conductive thin plate (of, e.g., Al) was disposed on the X-directional wirings 72 at a predetermined position with an insulating layer (not shown) therebetween.

A description will now be made, with reference to FIGS. 7, 8A and 8B, of an example in which a display device is made up by using the electron source manufactured as above and not yet subjected to the forming process.

First, the electron source 81 not yet subjected to the forming process was fixed onto a rear plate 82. Then, a face plate 90 (comprising a fluorescent film 88 as an image-forming member and a metal back 89 laminated on an inner surface of a glass substrate 87) was disposed 5 mm above the electron source 81 through a support frame 83. After applying frit glass to joined portions between the face plate 90, the support frame 83 and the rear plate 82, the assembly was baked in the atmosphere at temperature of 400° C. to 500° C. for 10 or more minutes for hermetically sealing the joined portions (see FIG. 7). Frit glass was also used to fix the electron source 81 to the rear plate 82.

While the fluorescent film 88 as the image-forming member comprises only a fluorescent substance in the monochrome case, it was fabricated in this Example by employing a stripe pattern of fluorescent substances and black conductors (see FIGS. 8A and 8B). The stripes of black conductors were formed by using a material containing graphite as a primary component which is usually employed in the art. Fluorescent substances were coated on the glass substrate 87 by the slurry method.

After forming the fluorescent film 88, the metal back 89 was formed on the inner surface of the fluorescent film by smoothing the inner surface of the fluorescent film (this step being usually called filming) and then depositing Al thereon by vacuum evaporation. To increase conductivity of the fluorescent film 88, the face plate 90 may include a transparent electrode (not shown) on an outer surface of the fluorescent film 88 in some cases. However, such a transparent electrode was not provided in this Example because sufficient conductivity was obtained with the metal back only. Before the above hermetic sealing, alignment of the respective parts was carried out with due care since the fluorescent substances in respective colors and the electron-emitting devices must be precisely positioned relative to each other in the case of color display.

The atmosphere in the glass enclosure thus completed was evacuated by a vacuum pump through an evacuation tube (not shown). After reaching a sufficient degree of vacuum, a voltage was applied between the electrodes 5 and 6 of the electron-emitting devices 84 through terminals Dox1 to Doxm and Doy1 to Doyn extending outwardly of the enclosure for producing the electron-emitting regions 3 through the energization process (forming process) of the electron-emitting region forming thin films 2. The voltage waveform used for the forming process was shown in FIG. 3.

Figure 3:
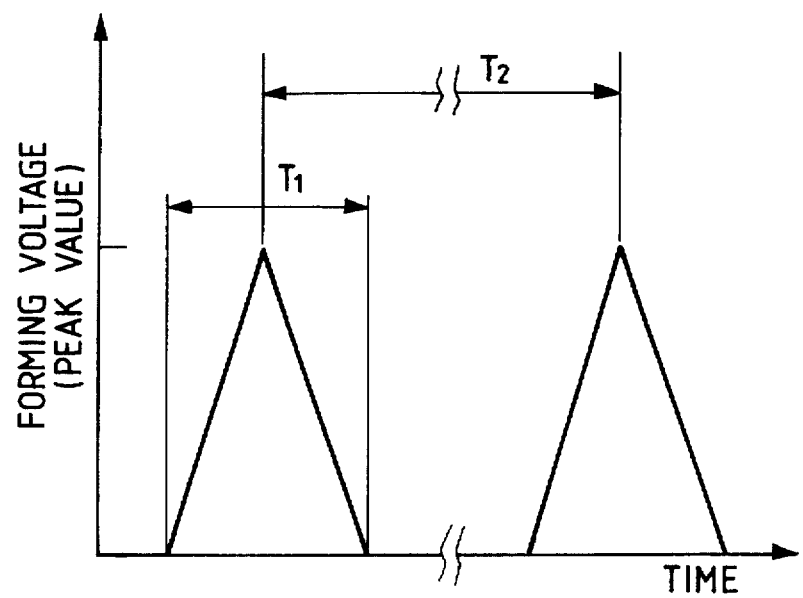
FIG. 3 is a chart showing one example of a voltage waveform applied in the forming process.

Referring to FIG. 3, $T_1$ and $T_2$ represent a pulse width and a pulse interval of the voltage waveform, respectively. In this Example, $T_1$ and $T_2$ were set respectively to 1 millisecond and 10 milliseconds, and a crest value of the triangular waveform (i.e., a peak voltage during the forming process) was set to 5 V. Then, the forming process was carried out for 60 seconds in a vacuum atmosphere of about $1 \times 10^{-6}$ Torr.

Next, at a vacuum degree of about $10^{-6}$ Torr, the evacuation tube (not shown) was heated and fused together by using a gas burner to hermetically seal the enclosure.

Finally, to maintain a desired vacuum degree in the enclosure after sealing off it, the enclosure was subjected to gettering.

In the image display device thus completed, a scan signal and a modulation signal were applied from respective signal generating means (not shown) to desired ones of the electron-emitting devices through the terminals Dox1 to Doxm and Doy1 to Doyn extending outwardly of the enclosure, thereby emitting electrons therefrom. Simultaneously, a high voltage was applied to the metal back 89 through a high-voltage terminal Hv so that electron beams were accelerated to impinge upon the fluorescent film 88. The fluorescent substances making up the film 88 were thereby excited to radiate lights for displaying an image. The voltage applied to the high-voltage terminal Hv was set to 5 kV, the voltage applied to the shield member 9 was set to 50 V, and the voltage applied between the pairs of device electrodes 5 and 6 was set to 14 V.

Under the above condition, because of a horizontal electric field established by the device electrodes 5, 6 in the vicinity of the electron-emitting region, electrons emitted from each of the electron-emitting regions 3 were forced to fly following the path deviated from the direction right above or perpendicular to the electron-emitting region 3 and hence were not blocked off by the shield member 9. On the other hand, positive ions produced near the face plate 90 were forced to fly following the path along a vertical electric field established by the applied high voltage, and hence could be blocked off by the shield member 9. Thus, there occurred no damage of the electron-emitting region 3 due to the positive ions.

In this Example, since the shield member 9 covered the areas right above parts of the device electrodes 5, 6 (see FIGS. 1A through 1C), the connecting leads 75 and the wirings 72, 73, in addition to the areas right above the electron-emitting regions 3 (see FIGS. 1A through 1C), no damages of the former members were found. It covered also parts of the exposed insulating surface 71 and therefore, no electric charge was generated at this position. It was also confirmed that by changing the electron passage holes 10 in shape and position, the electron beams could be shaped and/or deflected as desired.

EXAMPLE 2

Figure 12A:
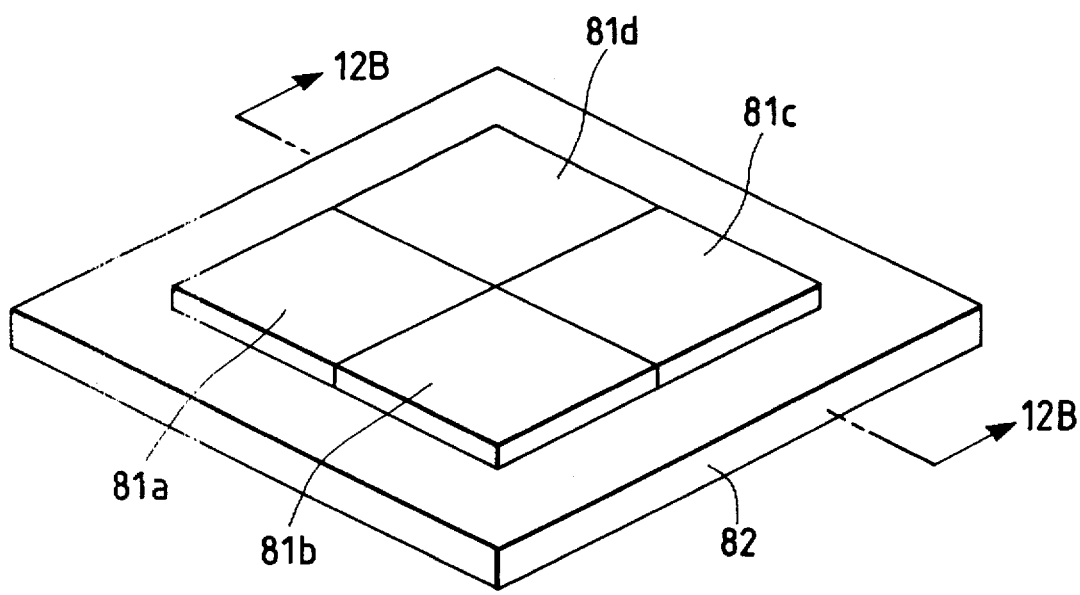
FIGS. 12A and 12B are respectively a schematic perspective and sectional view of the electron source as Example 2.
Figure 12B:
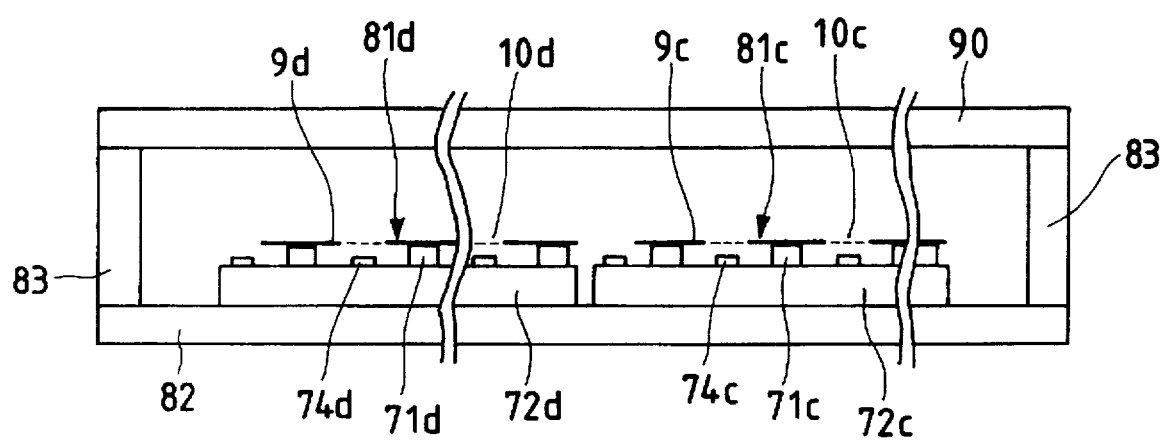

FIGS. 12A and 12B show an image-forming apparatus of this Example 2 in which: FIG. 12A is a perspective view showing a portion of the apparatus, and FIG. 12B is a sectional view taken along line 12B—12B in FIG. 12A. The image-forming apparatus of this Example 2 was different from that of Example 1 in that, as shown in FIG. 12A, four substrates 81a to 81d each constituting an electron source were combined with each other to make up an entire electron source. Note that other components than the electron source, such as the rear plate 82, the support frame 83 and the face plate 90, were identical to those in Example 1.

The 12B—12B section shown in FIG. 12A is viewed in the same direction as the 11A—11A section in FIG. 10. Each of the electron sources 81a –81d had basically the same structure as the electron source shown in FIGS. 10, 11A and 11B. As shown in FIG. 12B, for example, an electrode plate 9d as a shield member disposed on X-directional wirings 72d, which were in turn formed on a substrate 71d, with an insulating layer (not shown) therebetween had electron passage holes 10d for allowing electrons emitted from an electron-emitting device 74d to pass therethrough.

As with Example 1, the shield members 9a–9d had electron passage holes 10a–10d formed therein so as to cover the respective areas right above electron-emitting devices 74a–74d, particularly electron-emitting regions, but not to interfere with the respective paths of electrons emitted from the electron-emitting regions of the electron-emitting devices. Specifically, the electron passage holes 10a–10d formed respectively in the shield members 9a–9d were each circular with a radius of 30 μm and had the center at a position deviated 40 μm from the position right above the corresponding electron-emitting region.

In the image display device of this Example constructed as above, as with Example 1, a scan signal and a modulation signal were applied from respective signal generating means (not shown) to desired ones of the electron-emitting devices through the terminals Dox1 to Doxm and Doy1 to Doyn extending outwardly of the enclosure, thereby emitting electrons therefrom. Simultaneously, a high voltage was applied to the metal back 89 through the high-voltage terminal Hv so that electron beams were accelerated to impinge upon the fluorescent film 88. The fluorescent substances making up the film 88 were thereby excited to radiate lights for displaying an image. The voltage applied to the high-voltage terminal Hv was set to 5 kV, the voltage applied to the shield members 9a–9d was set to 100 V, and the voltage applied between the pairs of device electrodes 5 and 6 was set to 14 V.

The similar advantages as in Example 1 were also obtained in this Example 2. Additionally, with this Example, an image-forming apparatus capable of displaying images on a large-sized screen could be realized by using a plurality of electron sources and a plurality of shield electrode members.

This Example may be modified so as to have a plurality of shield electrode members on a single electron source. This modification could also provide the similar advantages as in Example 2.

Example 3

This Example concerns with an image-forming apparatus of the type that desired ones of surface conduction electron-emitting devices are selected by using control electrodes which have a modulation function as disclosed in Japanese Patent Application Laid-open No. 2-257551 filed by the assignee, wherein the shield electrode member of the present invention is added on the same side as the electron source having surface conduction electron-emitting devices as viewed from the control electrode.

Figure 13:
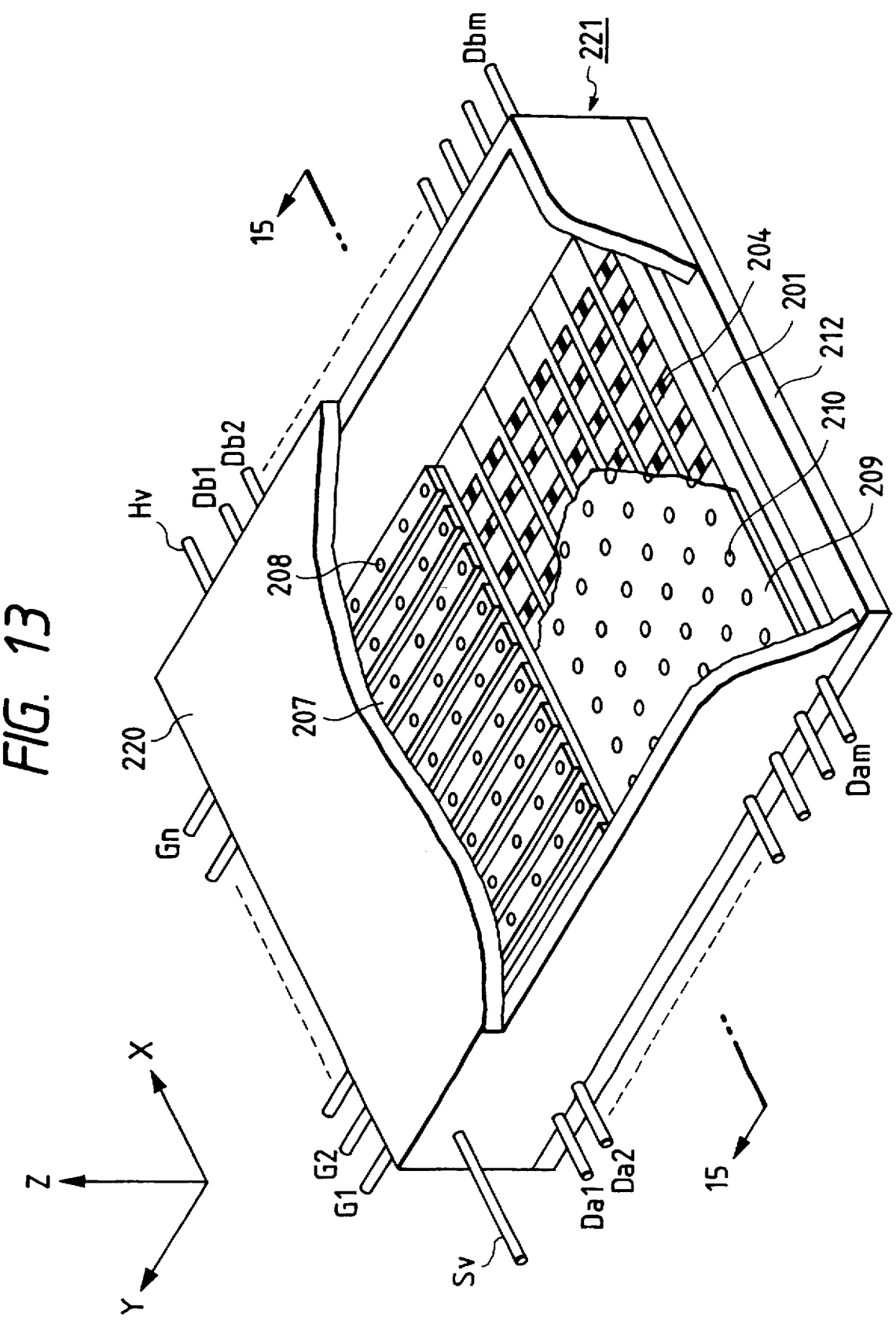
FIG. 13 is a perspective view, partly broken away, showing one example of construction of an image-forming apparatus as Example 3.
Figure 14:
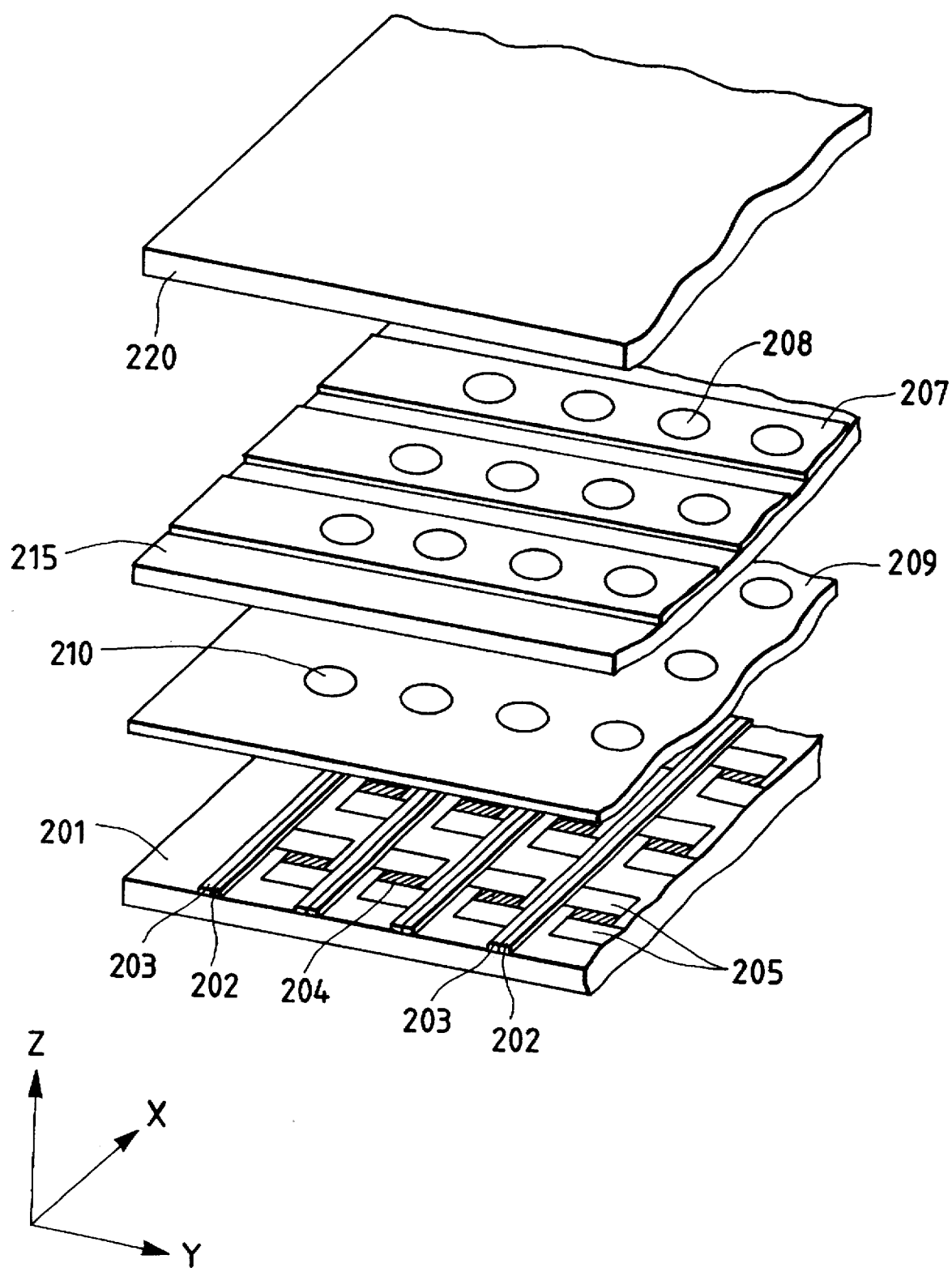
FIG. 14 is a partial perspective view of the image-forming apparatus shown in FIG. 13.
Figure 15:
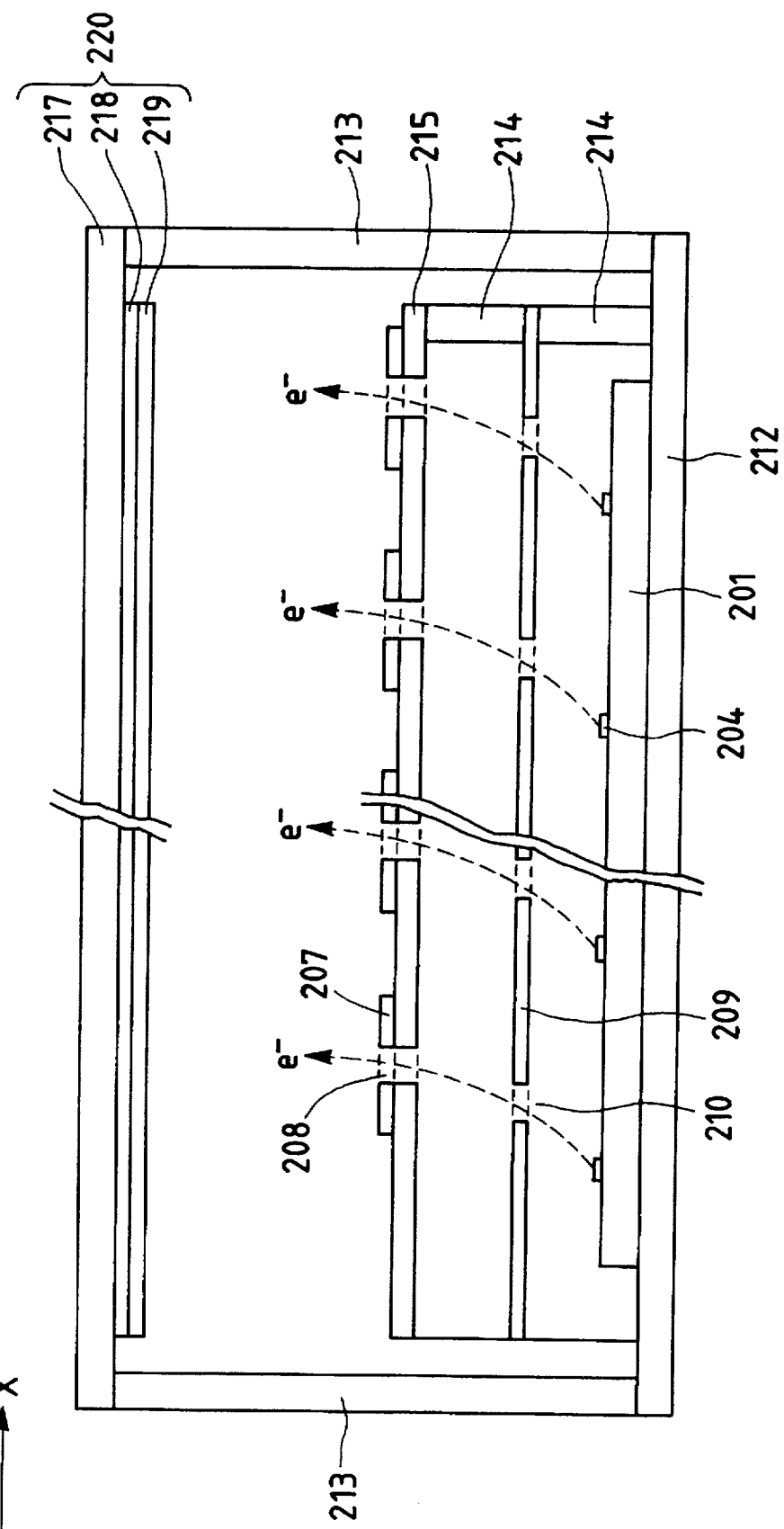
FIG. 15 is a sectional view of the image-forming apparatus shown in FIG. 13.

A schematic perspective view of the image-forming apparatus of this Example is shown in FIG. 13. Also, FIG. 14 shows a partial enlarged perspective view of FIG. 13 and FIG. 15 shows a section taken along line 15—15 in FIG. 13.

Referring to the drawings, denoted by 201 is an insulating substrate, 202 and 203 are respectively positive and negative electrode wirings formed on the insulating substrate 201 by, e.g., printing, and 204 is an electron emitting device. The electron-emitting device 204 was of a surface conduction electron-emitting device which had the conductive film 4 including the electron-emitting region 3 between the device electrodes 5 and 6 disposed side by side, as described above with reference to FIGS. 1A through 1C. A number of electron-emitting devices 204 were electrically connected to the positive electrode wirings 202 with a thickness of 50 μm and the negative electrode wirings 203 with a thickness of 50 μm by connecting leads 205.

Further, denoted by 209 is a shield member which was formed of a conductive thin plate (of, e.g., Al) and was disposed on the positive electrode wirings 202 and the negative electrode wirings 203 with an insulating layer (not shown) therebetween. The shield member 209 had electron passage holes 210 formed therein so as to cover the areas right above the electron-emitting devices 204, but not to interfere with the paths of electrons emitted from the electron-emitting devices 204. Specifically, the electron passage holes 210 formed in the shield member 209 were each circular with a radius of 30 μm and had the center at a position deviated 40 μm from the position right above the corresponding electron-emitting region.

The insulating substrate 201 and the components formed on the substrate 201 will be referred to together as an electron source 211.

Denoted by 207 is a stripe-shaped control electrode disposed midway between the electron source 211 and a face plate 220 (described later) in orthogonal relation to the positive electrode wirings 202 and the negative electrode wirings 203, and 208 is an electron passage hole defined in each of the control electrodes 207 corresponding to the electron-emitting devices 204 in one-to-one relation. The control electrodes 207 were formed on a support plate 215 and were held by support posts 214 midway between the electron source 211 and the face plate 220.

Denoted by 212 is a rear plate to which the electron source 211 was fixed, 220 is a face plate comprising a fluorescent film 218 and a metal back 219 laminated on an inner surface of a glass substrate 217, and 213 is a support frame. The fluorescent film 218 used herein as an image-forming member was similar to the fluorescent film 88 in Example 1.

In the image-forming apparatus of this Example, the rear plate 212, the support frame 213 and the face plate 220 were joined to each other in a hermetically sealed manner by using frit glass to thereby constitute an enclosure 221.

More specifically, the electron source 211 not yet subjected to the forming process was first fixed onto the rear plate 212. Then, the support plate 215 was fixedly disposed above the electron source 211 through the support posts 214. Further, the face plate 220 was disposed at 5 mm above the electron source 211 through the support frame 213. After applying frit glass to joined portions between the face plate 220, the support frame 213 and the rear plate 212, the assembly was baked in the atmosphere or a nitrogen atmosphere at temperature of 400° C. to 500° C. for 10 or more minutes for hermetically sealing the joined portions. Frit glass was also used to fix the electron source 211 to the rear plate 212 and fix the support plate 215 to the electron source 211.

Connected to respective voltage applying means (not shown) were the positive electrode wirings 202 through terminals Dal to Dam, the negative electrode wirings 203 through terminals Dbl to Dbn, the control electrodes 207 through terminals G1 to Gn, the shield electrode 209 through a terminal Sv, and the metal back 219 through a high-voltage terminal Hv, all of these terminals extending outwardly of the enclosure.

Before the above hermetic sealing, alignment of the respective parts was carried out with due care since the fluorescent substances in respective colors and the electron-emitting devices must be precisely positioned relative to each other in the case of color display. The control electrodes and the electron-emitting devices were also precisely positioned relative to each other with due care.

The atmosphere in the glass enclosure thus completed was evacuated by a vacuum pump through an evacuation tube (not shown). After reaching a sufficient degree of vacuum, a voltage was applied between the device electrodes through the terminals Dal to Dam and Dbl to Dbn extending outwardly of the enclosure for producing the electron-emitting regions through the energization process (forming process) of the electron-emitting devices 204, as with Example 1.

Next, at a vacuum degree of about $10^{-6}$ Torr, the evacuation tube (not shown) was heated and fused together by using a gas burner to hermetically seal the enclosure. To maintain a desired vacuum degree in the enclosure after sealing off it, the enclosure was subjected to gettering.

In the image display device thus completed, scan signals having required voltage waveforms were applied from respective signal generating means (not shown) to desired ones of the electron-emitting devices 204 through the terminals Dal to Dam and Dbl to Dbn extending outwardly of the enclosure, thereby emitting electrons therefrom, and a modulation signal having a required voltage waveform was applied from signal generating means (not shown) to desired one or more of the control electrodes 207 through the terminals G1 to Gn extending outwardly of the enclosure, thereby controlling the amounts of electrons passed through the electron passage holes 208. Simultaneously, a high voltage was applied to the metal back 219 through the high-voltage terminal Hv so that electron beams after passing through the electron passage holes 208 were accelerated to impinge upon the fluorescent film 218. The fluorescent substances making up the film 218 were thereby excited to radiate lights for displaying an image.

The distance between the electron-emitting devices 204 of the electron source 211 and the metal back 219 was set to 5 mm, the voltage applied to the high-voltage terminal Hv was set to 5 kV, the voltage applied to the shield member or electrode 209 was set to 100 V, and the voltage applied between the pairs of device electrodes of the electron-emitting devices 204 was set to 14 V.

The similar advantages as in Example 1 were also obtained in the Example 3. Additionally, with this Example, potential distribution between the shield electrode 209 and the electron-emitting devices 204 could be kept substantially uniform with the provision of the shield electrode 209 regardless of the modulation voltage applied to the control electrodes 207. Therefore, the image display device being more stable in the position and shape of light flux radiated could be realized.

Figure 16:
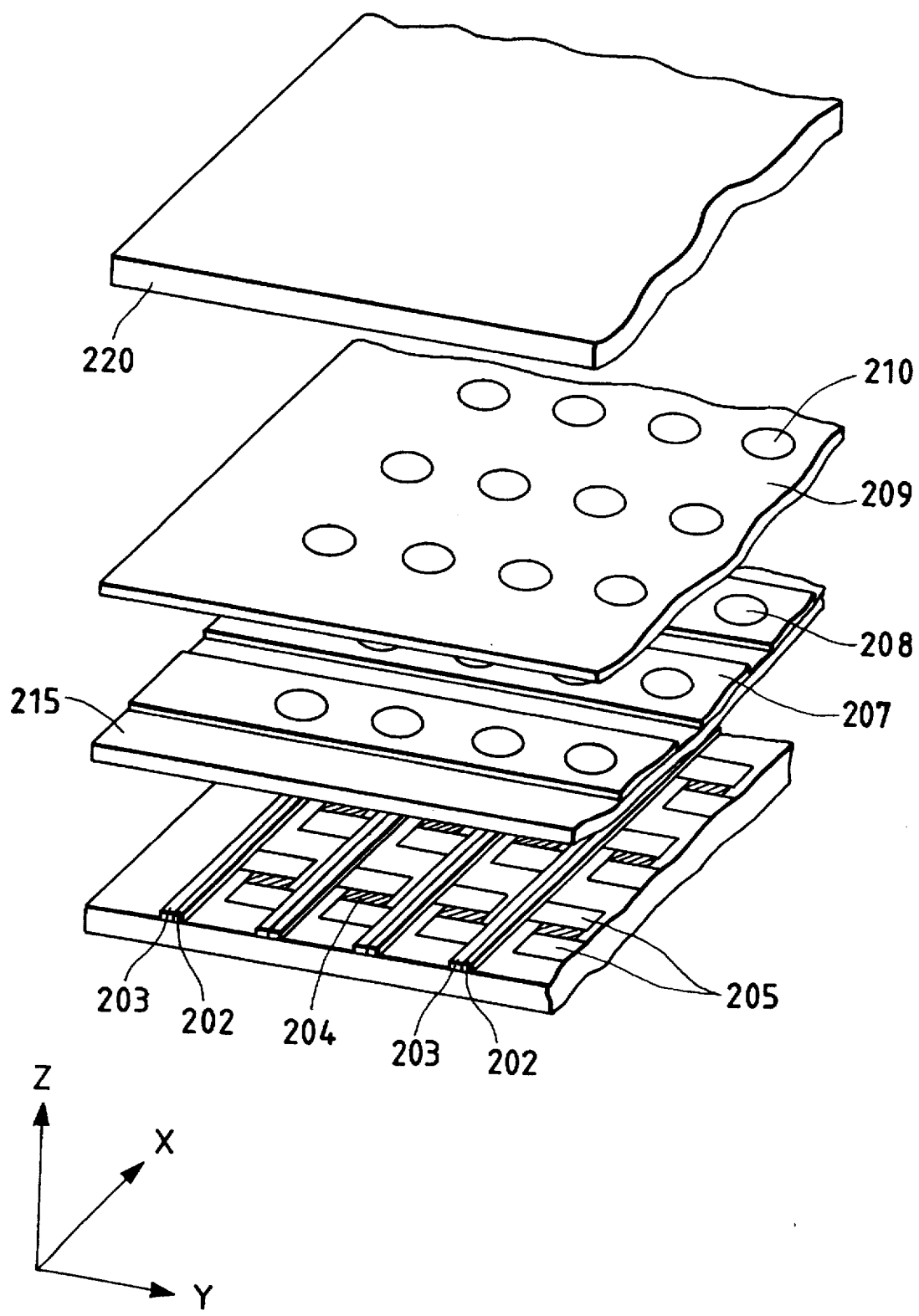
FIG. 16 is a partial perspective view of an image-forming apparatus as a modification of Example 3.
Figure 17:
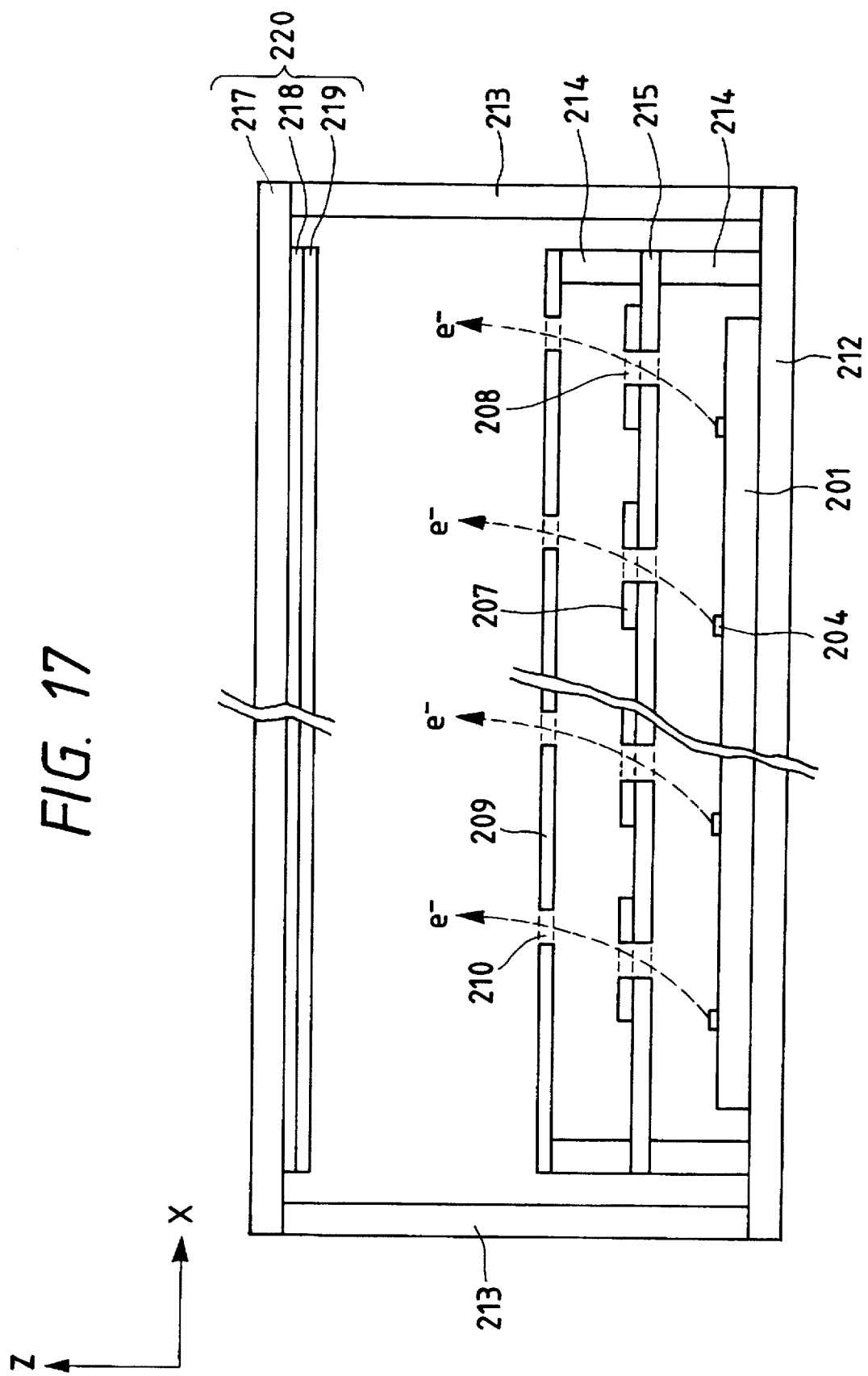
FIG. 17 is a sectional view of the image-forming apparatus shown in FIG. 16.

One modification of this Example was obtained, as shown in a partial enlarged perspective view of FIG. 16 and a sectional view of FIG. 17, by arranging the shield member 209 between the face plate 220 and the control electrodes 207. With this modification, potential distribution between the shield electrode 209 and the face plate 220 could be kept substantially uniform with the provision of the shield electrode 209 regardless of the modulation voltage applied to the control electrodes 207. As a result, in addition to the similar advantages as in Example 1, positive ions produced near the face plate 220 could be surely blocked off.

Example 4

Figure 18:
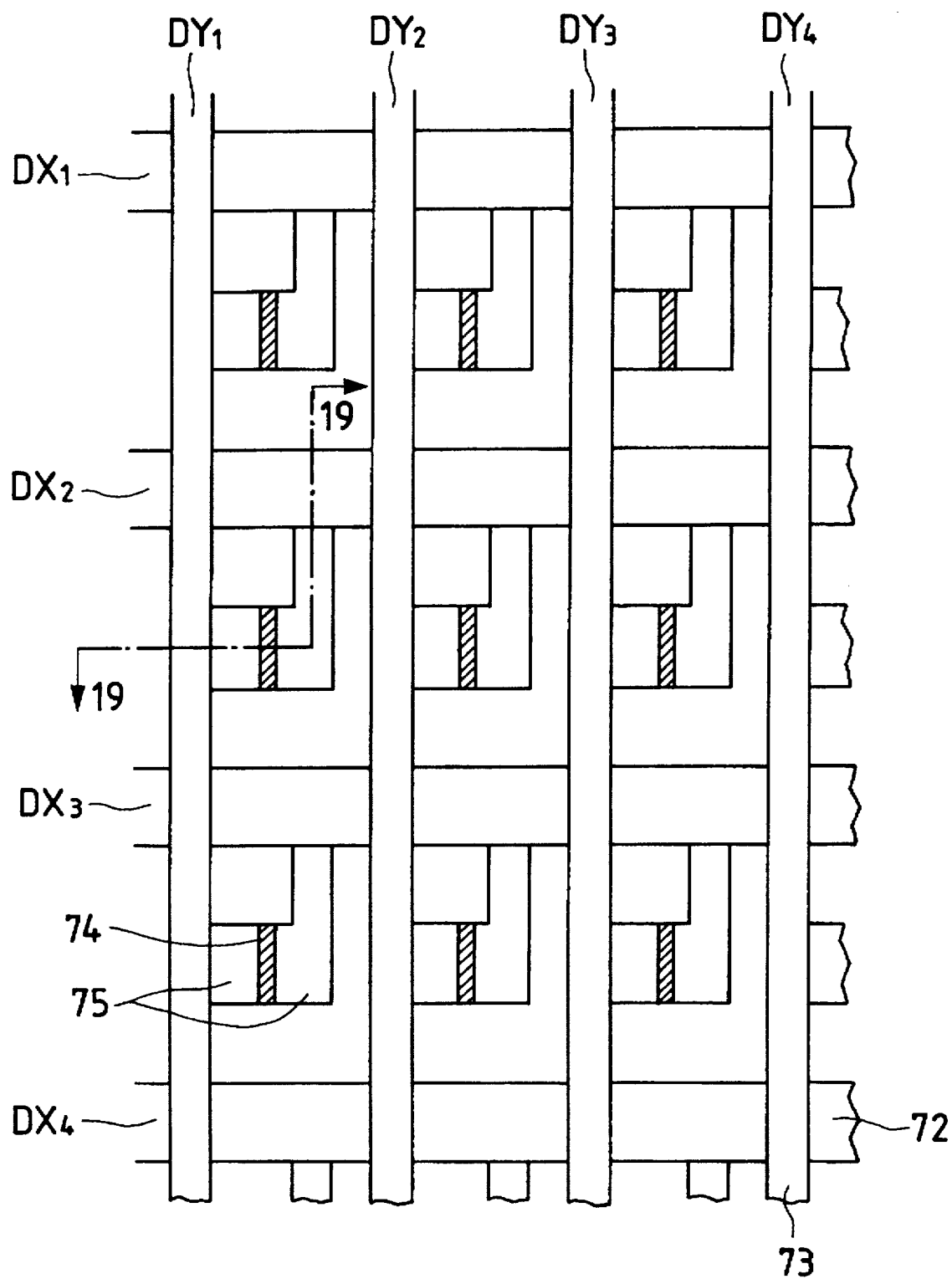
FIG. 18 is a partial plan view of an electron source shown as Example 4.
Figure 19:
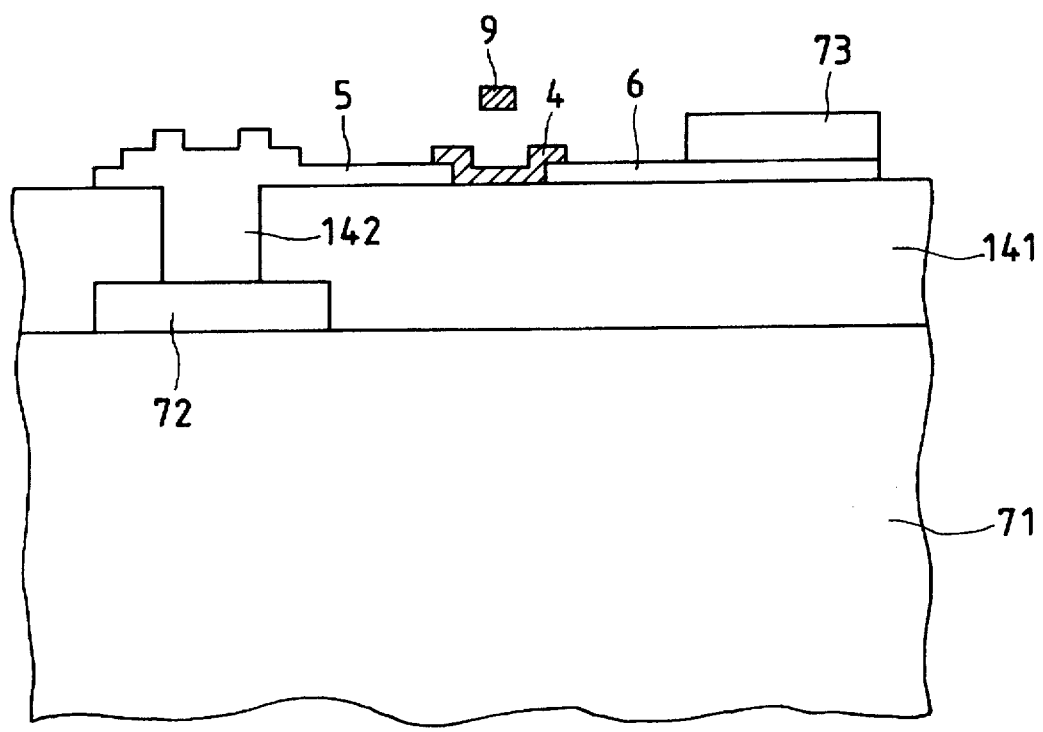
FIG. 19 is a partial sectional view of the electron source shown in FIG. 18.

The following description will be made of Example 4 in which an image-forming apparatus of the type shown in FIG. 7 was manufactured by using an electron source of the type shown in FIG. 6 that comprises a number of electron-emitting devices including shield members as shown in FIGS. 1A through 1C. FIG. 18 is a plan view of part of the electron source and FIG. 19 is a sectional view taken along line 19—19 in FIG. 18. Note that, in FIGS. 7, 18 and 19, the same reference numerals denote identical members. Referring to the drawings, denoted by 71 is an insulating substrate, 72 is an X-directional wiring, 73 is a Y-directional wiring, 4 is a conductive film including an electron-emitting region, 5 and 6 are device electrodes, 141 is an interlayer insulating layer, and 142 is a contact hole for electrical connection between the device electrode 5 and the X-directional wiring 72.

The manufacture process of the electron source will first be described in detail in the order of successive steps with reference to FIGS. 20A through 20M. Note that the following steps a to m correspond to FIGS. 20A through 20M, respectively.

Step a: A silicon oxide film being 0.5 μm thick was formed on a cleaned soda lime glass, as the substrate 71, by sputtering. A Cr film being 50 Å thick and an Au film being 6000 Å thick were then laminated on the substrate 71 in this order by vacuum evaporation. A photoresist (AZ1370, by Hoechst Co.) was coated thereon under rotation by using a spinner and then baked. Thereafter, by exposing and developing a photomask image, a resist pattern for the X-directional wirings 72 was formed. The deposited Au/Cr films were selectively removed by wet etching to thereby form the X-directional wirings 72 in a desired pattern.

Step b: Then, the interlayer insulating layer 141 formed of a silicon oxide film being 1.0 μm thick was deposited over the substrate by RF sputtering.

Step c: A photoresist pattern for forming the contact holes 142 in the silicon oxide film deposited in the above step b was coated thereon and, by using it as a mask, the interlayer insulating layer 141 was selectively etched to form the contact holes 142. The etching was carried out by the RIE (Reactive Ion Etching) process using a gas mixture of $CF_4$ and $H_2$.

Step d: A photoresist (RD-200N-41, by Hitachi Chemical Co., Ltd.) was formed in a pattern to define the device electrodes and the gaps therebetween. A Ti film being 50 Å thick and an Ni film being 1000 Å thick were then deposited thereon in this order by vacuum evaporation. The photoresist pattern was dissolved in an organic solvent to leave the deposited Ni/Ti films by lift-off, whereby the device electrodes 5, 6 having the electrode gap of 3 μm and the electrode width of 300 μm were formed.

Step e: A photoresist pattern for the Y-directional wirings 73 was formed on the device electrodes 5 and 6. A Ti film being 50 Å thick and an Au film being 5000 Å thick were then deposited thereon in this order by vacuum evaporation. The unnecessary deposits on the photoresist pattern were removed to form the Y-directional wirings 73 in a desired pattern by lift-off.

Figure 21:
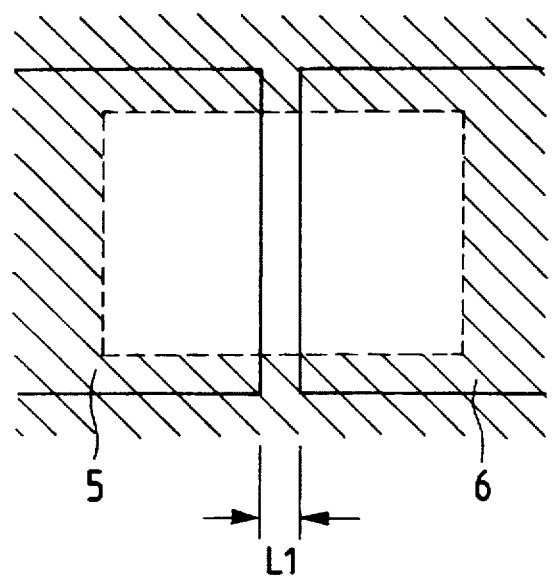
FIG. 21 is a partial showing a mask used in the manufacture step of the electron source shown in FIG. 18.
Figure 20A:
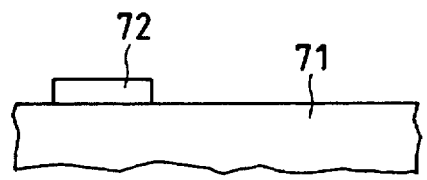
FIGS. 20A through 20M are sectional views for explaining successive manufacture steps of the electron source shown in FIG. 18.
Figure 20B:
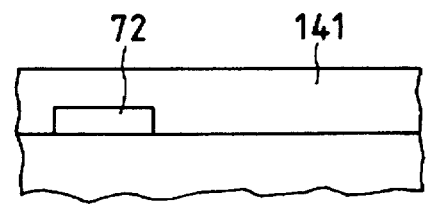
Figure 20C:
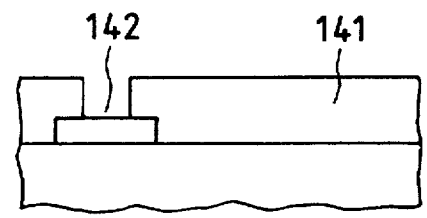
Figure 20D:
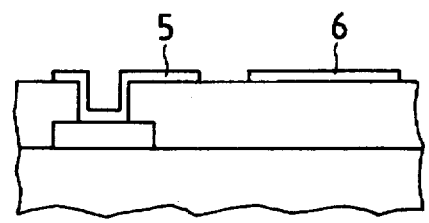
Figure 20E:
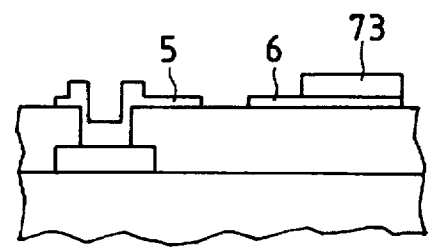
Figure 20F:
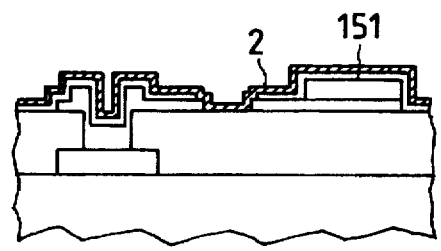
Figure 20G:
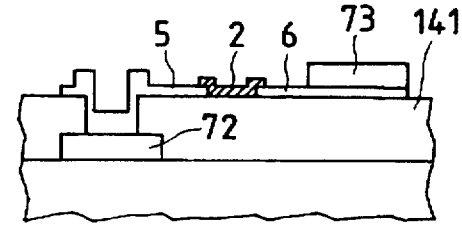
Figure 20H:
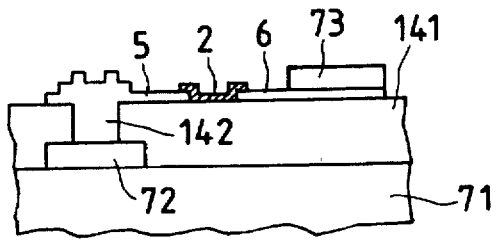
Figure 20I:
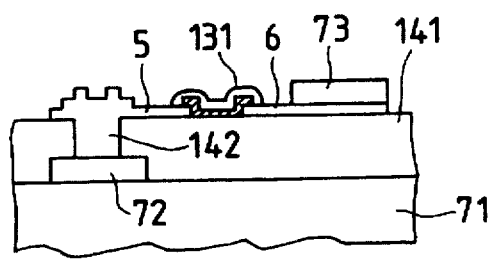
Figure 20J:
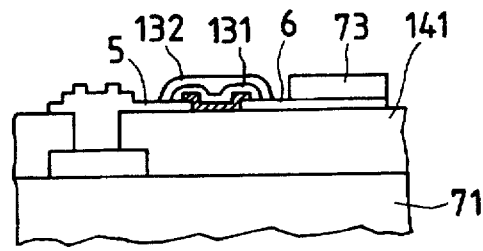
Figure 20K:
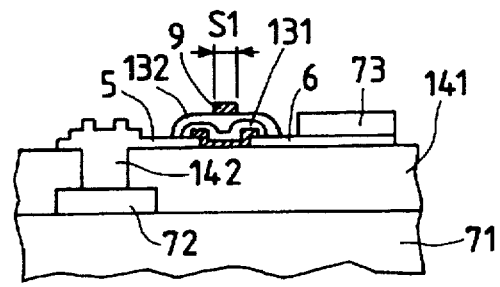
Figure 20L:
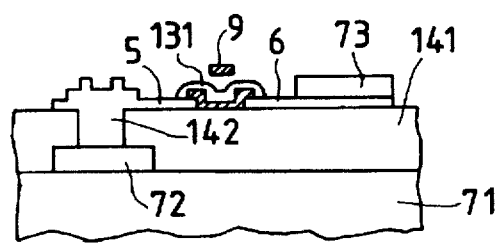
Figure 20M:
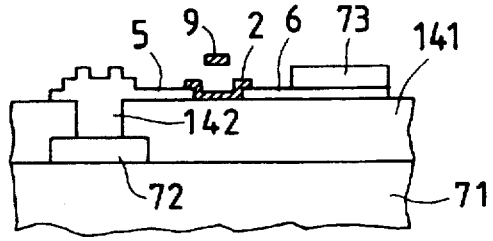

Step f: FIG. 21 is a plan view of part of a mask used in this step to form an electron-emitting region forming thin film 2 of the electron-emitting device. The mask has an opening covering each gap L1 between the device electrodes and the vicinity thereof. A Cr film 151 being 1000 Å thick was deposited by vacuum evaporation and patterned by using the mask. Organic Pd (ccp-4230, by Okuno Pharmaceutical Co., Ltd.) was coated thereon under rotation by using a spinner and then heated for baking at 300° C. for 10 minutes.

The electron-emitting region forming thin film 2 thus formed and comprising fine particles of Pd as a primary constituent element had a thickness of about 100 Å and a sheet resistance value of $5 \times 10^4$ Ω/□. The term "fine particle film" used herein means a film comprising a number of fine particles aggregated together, and includes films having microstructures in which fine particles are not only individually dispersed, but also adjacent to or overlapped with each means a diameter of fine particles whose shape is discernable under the above particle condition.

Step g: The Cr film 151 after the baking was etched by an acid etchant to provide the electron-emitting region forming thin film 2 in a desired pattern.

Step h: A resist was coated in a pattern to cover the surface other than the contact holes 142. A Ti film being 50 Å thick and an Au film being 5000 Å thick were then deposited thereon in this order by vacuum evaporation. The unnecessary deposits on the resist pattern was removed to leave the contact holes 142 filled with the deposits by lift-off.

Step i: A protective layer 131 formed of a Cr thin film was formed to cover the electron-emitting region forming thin film 2.

Step j: A positive photoresist (AZ1350J, by Hoechst Co.) was coated with a thickness of 5 μm by using a spin coater and then patterned to form a sacrifice layer 132 which is removed in a later-described step i to provide a vacant space.

Step k: An Al thin film serving as the shield member 9 was formed and then patterned to have a width (S1) of 0.5 μm. The patterning was made to connect the shield member 9 to either the device electrode 5 or 6.

Step l: The photoresist forming the sacrifice layer 132 was etched by the RIE process using a gas layer 132 was etched by the RIE process using a gas mixture of oxygen and $CF_4$.

Step m: The Cr thin film forming the protective layer 131 was removed by wet etching.

As a result of the above steps, the X-directional wirings 72, the interlayer insulating layer 141, the Y-directional wirings 73, the device electrodes 5, 6, the electron-emitting region forming thin films 2, the shield members 9, etc. were formed on the insulating substrate 71.

The electron source thus manufactured and not yet subjected to the forming process was installed in the enclosure 91 shown in FIG. 7 and then subjected to the forming process, followed by hermetically sealing the enclosure and gettering the interior of the enclosure to construct an image display device of the type shown in FIG. 7, as with Example 1.

In the image display device constructed as above, as with Example 1, a scan signal and a modulation signal were applied from respective signal generating means (not shown) to desired ones of the electron-emitting devices through the terminals Dox1 to Doxm and Doy1 to Doyn extending outwardly of the enclosure, thereby emitting electrons therefrom. Simultaneously, a high voltage was applied to the metal back 89 through the high-voltage terminal Hv so that emitted electron beams were accelerated to impinge upon the fluorescent film 88. The fluorescent substances making up the film 88 were thereby excited to radiate lights for displaying an image. The voltage applied to the high-voltage terminal Hv was set to 5 kV, and the voltage applied between the pairs of device electrodes 5 and 6 was set to 14 V. Further, one of the device electrodes 5 and 6 connected to the shield member 9 was set to have a higher potential. The similar advantages as in Example 1 were also obtained in this Example 4.

One modification of this Example was obtained by additionally providing a wiring connected to each shield member 9 and means for applying a voltage to the wiring so as to regulate a potential of the shield member 9. With this modification, the similar advantages as in Example 1 were resulted by applying 10 V to the shield member.

Another modification of this Example was obtained by forming the shield member 9 to cover the whole of the electron-emitting region including conductive film 4 or the whole of the device electrodes 5, 6. This modification could also provide the similar advantages as in Example 1.

Still another modification of this Example was obtained by forming the plurality of electron-emitting devices on the substrate, and forming the interlayer insulating layer between the X-directional wirings and the Y-directional wirings to only cover each of the areas where the X- and Y-directional wirings intersect, so that the device electrodes were electrically connected to the X- and Y-directional wirings, which were formed directly on the insulating substrate, without using contact holes.

Example 5

Figure 23:
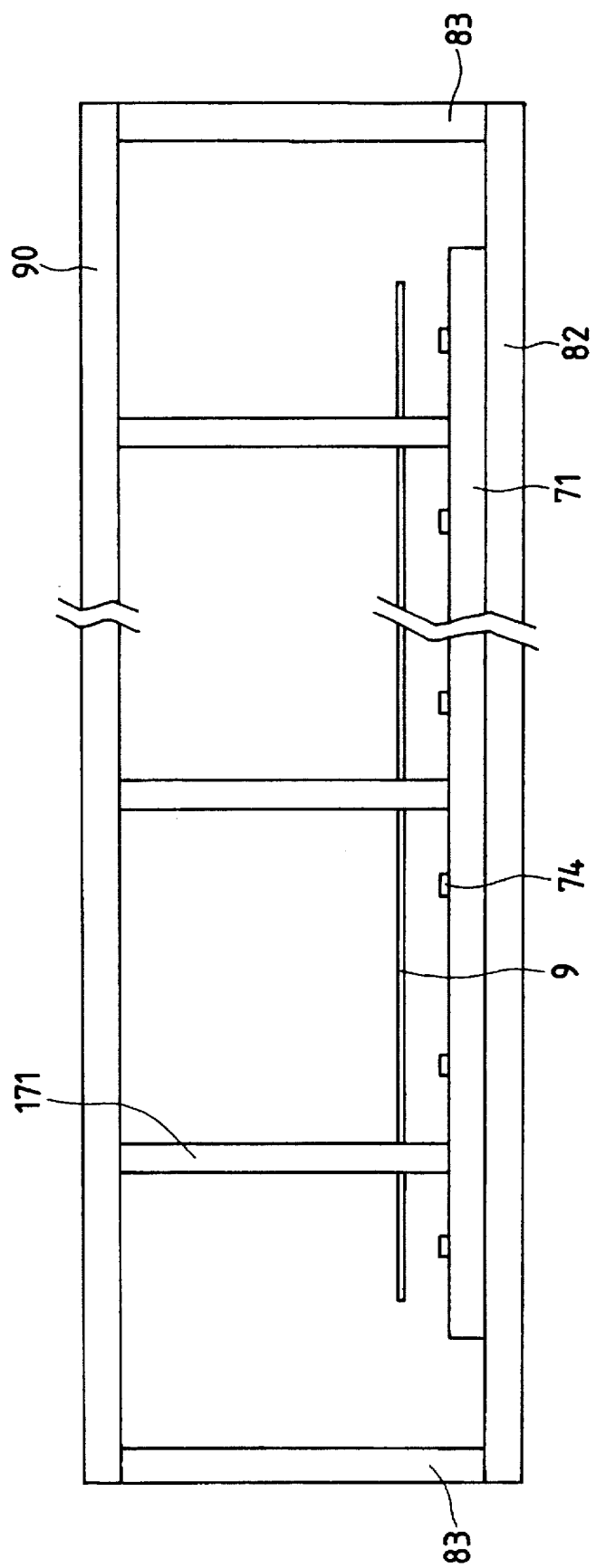
FIG. 23 is a sectional view of an image-forming apparatus constructed by using the electron source shown in FIG. 22.
Figure 24A:
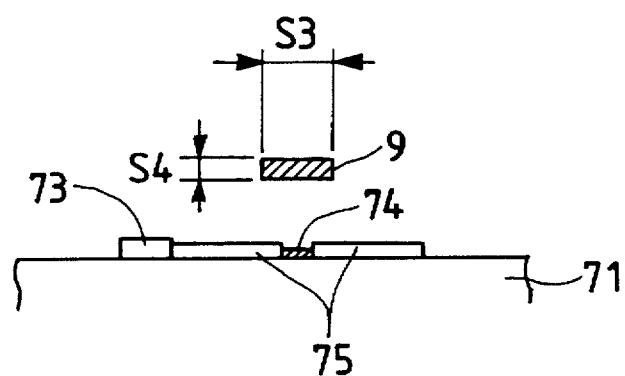
FIGS. 24A and 24B are partial sectional views of the electron source shown in FIG. 22.
Figure 24B:
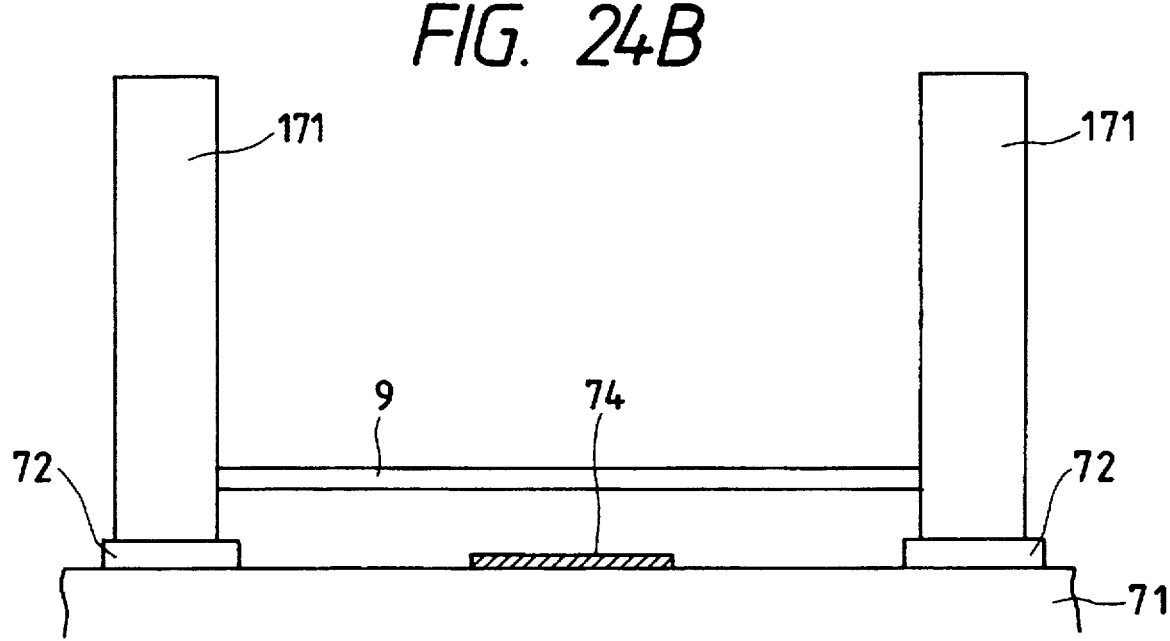

The following description will be made of Example 5 in which an image-forming apparatus of the type shown in FIG. 7 was manufactured by using an electron source shown in FIGS. 22 and 23. FIG. 22 is a schematic perspective view of part of the electron source and FIG. 23 is a vertical sectional view. Also, sections taken respectively along line 24A—24A and 24B—24B in FIG. 22 are shown in FIGS. 24A and 24B, respectively. Note that, in FIGS. 7, 22, 23, 24A and 24B, the same reference numerals denote identical members. Referring to the drawings, denoted by 171 is a spacer provided to keep a spacing between a substrate 71 including the electron source and a face plate 90 including a fluorescent film, and 9 is a rod-shaped shield member fixed to the spacers 171. The spacers 171 were each disposed on an X-directional wiring 72. The shield member 9 was selected in position and size so as to cover the areas right above electron-emitting devices 74, but not to interfere with the paths of electrons emitted from respective electron-emitting regions of the electron-emitting devices 74. Specifically, the shield member 9 being 80 μm wide (indicated by S3 in FIG. 24A) and 80 μm high (indicated by S4 in FIG. 24A) was formed in the position spaced 200 μm right above the electron-emitting device. The distance between the surface of the substrate 71 in which the electron-emitting devices were formed and the metal back surface of the face plate 90 was set to 5 mm.

It is preferable that the spacers 171 and the shield members 9 be at least slightly conductive for the purpose of stabilizing the potential near the electron paths. In this Example, therefore, these components were each prepared by spray-coating a conductive film on the surface of a soda glass. Also, voltage applying means (not shown) was connected to the spacers 171 and the shield members 9 for applying a certain voltage to them.

The shield members 9 may be integrally molded with the spacers 171 beforehand, or joined to the spacers during the assembly step.

In the image display device completed in a like manner to Example 1 by using the electron source of this Example, as with Example 1, a scan signal and a modulation signal were applied from respective signal generating means (not shown) to desired ones of the electron-emitting devices through the terminals Dox1 to Doxm and Doy1 to Doyn extending outwardly of the enclosure, thereby emitting electrons therefrom. Simultaneously, a high voltage was applied to the metal back 89 through the high-voltage terminal Hv so that emitted electron beams were accelerated to impinge upon the fluorescent film 88. The fluorescent substances making up the film 88 were thereby excited to radiate lights for displaying an image. The voltage applied to the high-voltage terminal Hv was set to 5 kV, and the voltage applied between the pairs of device electrodes 5 and 6 was set to 14 V. The similar advantages as in Example 1 were also obtained in this Example 5. Additionally, there occurred no accumulation of undesired charges on the spacers 171.

One modification of this Example was obtained by additionally providing a wiring connected to each shield member 9 and means for applying a voltage to the wiring so as to regulate a potential of the shield member 9. With this modification, the similar advantages as in Example 1 were resulted by applying 200 V to the shield member.

Example 6

Figure 25:
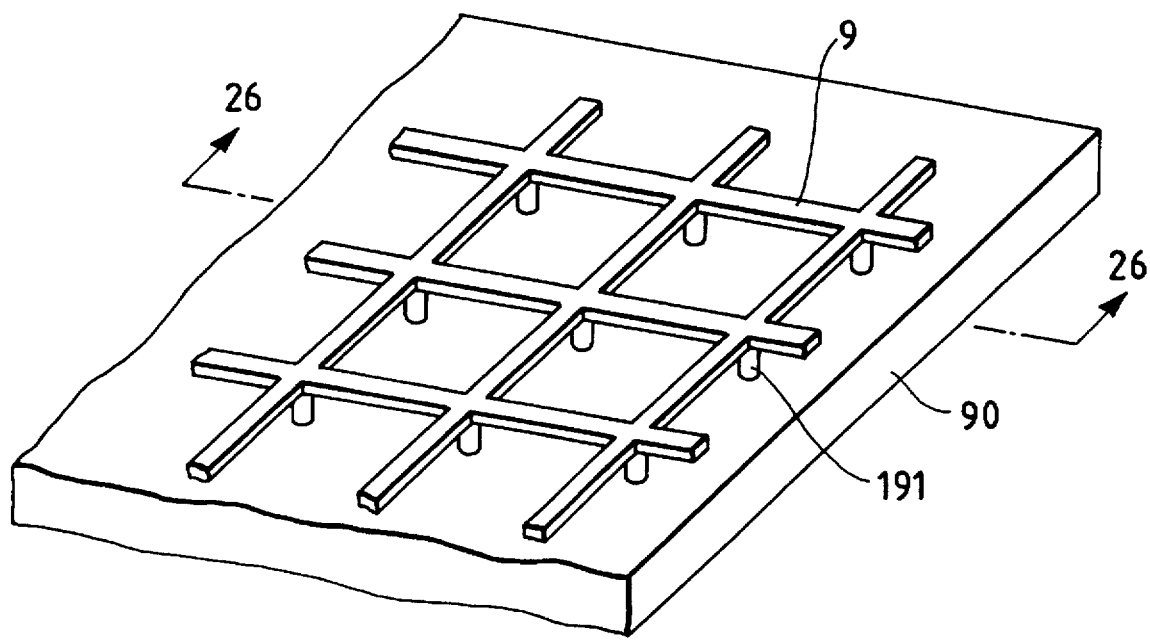
FIG. 25 is a partial perspective view of a face plate shown as Example 6.
Figure 26:
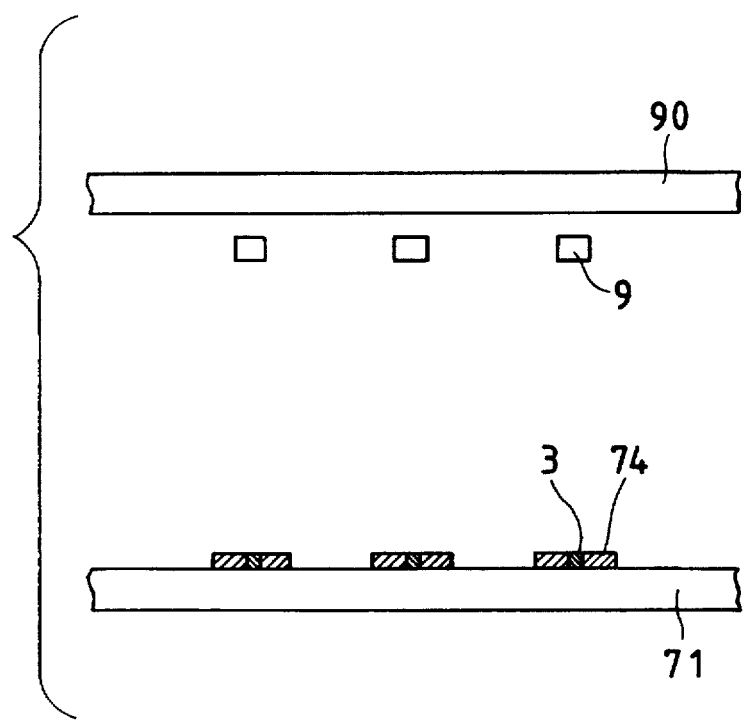
FIG. 26 is a partial sectional view of an image-forming apparatus shown as Example 5.

The following description will be made of Example 6 in which an image-forming apparatus of the type shown in FIG. 7 was manufactured in a like manner to Example 1 except that a shield member provided on a face plate 90 through spacers 191, as shown in FIG. 25, was used as the shield member 9 in the electron source (see FIG. 10) of Example 1. FIG. 25 is a schematic perspective view of part of the face plate 90 provided with the shield member 9, and FIG. 26 shows a section taken along line 26—26 in FIG. 25, including a section of an electron source substrate 71 located in opposite relation to face the face plate 90. Note that, in FIGS. 7, 25 and 26, the same reference numerals denote identical members.

The shield member 9 was made of a conductive material (such as Al) in the mesh-like form and was held by the spacers 191 with a certain spacing kept relative to the face plate 90. The shield member 9 was selected in mesh position and mesh size so as to cover at least the areas right above electron-emitting devices 74, but not to totally interfere with the paths of electrons emitted from respective electron-emitting regions of the electron-emitting devices 74. The shield member 9 was located at the position spaced from the face plate 90 by a distance corresponding to 10% of the spacing between the electron source substrate 71 and the face plate 90. Also, a voltage was applied from a DC power supply (not shown) to the shield member 9 so that the potential of the shield member 9 was equal or about 10% lower than the potential applied to the face plate 90.

In the image display device completed in a like manner to Example 1 except for the above construction, as with Example 1, a scan signal and a modulation signal were applied from respective signal generating means (not shown) to desired ones of the electron-emitting devices through the terminals Dox1 to Doxm and Doy1 to Doyn extending outwardly of the enclosure, thereby emitting electrons therefrom. Simultaneously, a high voltage over several kV was applied to the metal back 89 through the high-voltage terminal Hv so that emitted electron beams were accelerated to impinge upon the fluorescent film 88. The fluorescent substances making up the film 88 were thereby excited to radiate lights for displaying an image. The similar advantages as in Example 1 were also obtained in this Example 6.

Example 7

Figure 9:
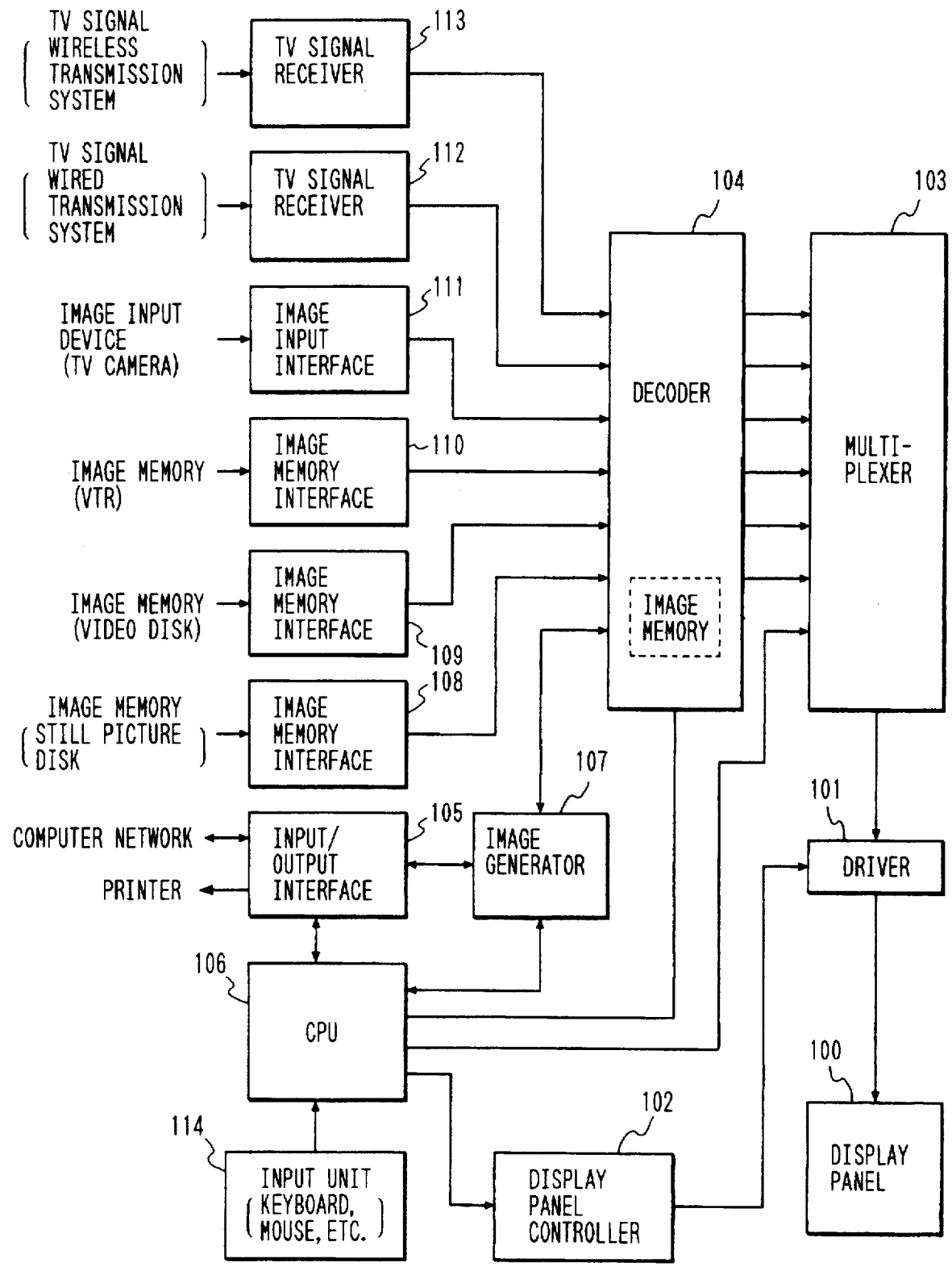
FIG. 9 is a block diagram showing one example of construction of an image display device according to the present invention.

FIG. 9 is a block diagram showing one example of an image display device in which any of the display devices (display panels) manufactured in Examples 1 to 6 was designed to be able to display image information provided from various image information sources including TV broadcasting, for example. In FIG. 9, denoted by 100 is a display panel, 101 is a driver for the display panel, 102 is a display panel controller, 103 is a multiplexer, 104 is a decoder, 105 is an input/output interface, 106 is a CPU, 107 is an image generator, 108, 109 and 110 are image memory interfaces, 111 is an image input interface, 112 and 113 are TV signal receivers, and 114 is an input unit. (When the present display device receives a signal, e.g., a TV signal, including both video information and voice information, the device of course displays an image and reproduces voices simultaneously. But circuits, a speaker and so on necessary for reception, separation, reproduction, processing, storage, etc. of voice information, which are not directly related to the features of the present invention, will not described here.)

Functions of the above parts will be described below along the flow of image signals.

First, the TV signal receiver 113 is a circuit for receiving a TV image signal transmitted through a wireless transmission system in the form of electric waves or spatial optical communication, for example. A type of the TV signal to be received is not limited to particular one, but may be any type of the NTSC-, PAL- and SECAM-standards, for example. Another type TV signal (e.g., so-called high-quality TV signal including the MUSE-standard type) having the larger number of scan lines than the above types is a signal source fit to utilize the advantage of the above display panel which is suitable for an increase in the screen size and the number of pixels. The TV signal received by the TV signal receiver 113 is output to the decoder 104.

Then, the TV signal receiver 112 is a circuit for receiving a TV image signal transmitted through a wire transmission system in the form of coaxial cable or optical fibers. As with the TV signal receiver 113, a type of the TV signal to be received by the TV signal receiver 112 is not limited to particular one. The TV signal received by the receiver 112 is also output to the decoder 104.

The image input interface 111 is a circuit for taking in an image signal supplied from an image input device such as a TV camera or an image reading scanner, for example. The image signal taken in by the interface 111 is output to the decoder 104.

The image memory interface 110 is a circuit for taking in an image signal stored in a video tape recorder (hereinafter abbreviated to a VTR). The image signal taken in by the interface 110 is output to the decoder 104.

The image memory interface 109 is a circuit for taking in an image signal stored in a video disk. The image signal taken in by the interface 109 is output to the decoder 104.

The image memory interface 108 is a circuit for taking in an image signal from a device storing still picture data, such as a so-called still picture disk. The image signal taken in by the interface 108 is output to the decoder 104.

The input/output interface 105 is a circuit for connecting the display device to an external computer or computer network, or an output device such as a printer. It is possible to perform not only input/output of image data and character/figure information, but also input/output of a control signal and numeral data between the CPU 106 in the display device and the outside in some cases.

The image generator 107 is a circuit for generating display image data based on image data and character/figure information input from the outside via the input/output interface 105, or image data and character/figure information output from the CPU 106. Incorporated in the image generator 107 are, for example, a rewritable memory for storing image data and character/figure information, a read only memory for storing image patterns corresponding to character codes, a processor for image processing, and other circuits required for image generation.

The display image data generated by the image generator 107 is usually output to the decoder 104, but may also be output to an external computer network or a printer via the input/output interface 105 in some cases.

The CPU 106 carries out primarily operation control of the display device and tasks relating to generation, selection and editing of a display image.

For example, the CPU 106 outputs a control signal to the multiplexer 103 for selecting one of or combining ones of image signals to be displayed on the display panel as desired. In this connection, the CPU 106 also outputs a control signal to the display panel controller 102 depending on the image signal to be displayed, thereby properly controlling the operation of the display device in terms of picture display frequency, scan mode (e.g., interlace or non-interlace), the number of scan lines per picture, etc.

Furthermore, the CPU 106 outputs image data and character/figure information directly to the image generator 107, or accesses to an external computer or memory via the input/output interface 105 for inputting image data and character/figure information.

It is a matter of course that the CPU 106 may be used in relation to any suitable tasks for other purposes than the above. For example, the CPU 106 may directly be related to functions of producing or processing information as with a personal computer or a word processor.

Alternatively, the CPU 106 may be connected to an external computer network via the input/output interface 105, as mentioned above, to execute numerical computations and other tasks in cooperation with external equipment.

The input unit 114 is employed when a user enters commands, programs, data, etc. to the CPU 106, and may be any of various input equipment such as a keyboard, mouse, joy stick, bar code reader, and voice recognition device.

The decoder 104 is a circuit for reverse-converting various image signals input from the circuits 107 to 113 into signals for three primary colors, or a luminance signal, an I signal and a Q signal. As indicated by dot lines in the drawing, the decoder 104 preferably includes an image memory therein. This is because the decoder 104 also handles those TV signals including the MUSE-standard type, for example, which require an image memory for the reverse-conversion. Further, the provision of the image memory brings about an advantage of making it possible to easily display a still picture, or to easily perform image processing and editing, such as thinning-out, interpolation, enlargement, reduction and synthesis of images, in cooperation with the image generator 107 and the CPU 106.

The multiplexer 103 selects a display image in accordance with the control signal input from the CPU 106 as desired. In other words, the multiplexer 103 selects desired one of the reverse-converted image signals input from the decoder 104 and outputs it to the driver 101. In this connection, by switchingly selecting two or more of the image signals in a display time for one picture, different images can also be displayed separately in plural areas defined by dividing one screen as with the so-called multiscreen television.

The display panel controller 102 is a circuit for controlling the operation of the driver 101 in accordance with a control signal input from the CPU 106.

As a function relating to the basic operation of the display panel, the controller 102 outputs to the driver 101 a signal for controlling, by way of example, the operation sequence of a power supply (not shown) for driving the display panel.

Also, as a function relating to a method of driving the display panel, the controller 102 outputs to the driver 101 signals for controlling, by way of example, a picture display frequency and a scan mode (e.g., interlace or non-interlace).

Depending on cases, the controller 102 may output to the driver 101 control signals for adjustment of image quality in terms of luminance, contrast, tone and sharpness of the display image.

The driver 101 is a circuit for producing a drive signal applied to the display panel 100. The driver 101 is operated in accordance with the image signal input from the multiplexer 103 and the control signal input from the display panel controller 102.

With the various components arranged as shown in FIG. 9 and having the functions as described above, the display device can display image information input from a variety of image information sources on the display panel 100. More specifically, various image signals including the TV broadcasting signal are reverse-converted by the decoder 104, and at least one of them is selected by the multiplexer 103 and then input to the driver 101. On the other hand, the display panel controller 102 issues a control signal for controlling the operation of the driver 101 in accordance with the image signal to be displayed. The driver 101 applies a drive signal to the display panel 100 in accordance with both the image signal and the control signal. An image is thereby displayed on the display panel 100. A series of operations mentioned above are controlled under supervision of the CPU 106.

In addition to simply displaying the image information selected from plural items with the aid of the image memory built in the decoder 104, the image generator 107 and the CPU 106, the present display device can also perform, on the image information to be displayed, not only image processing such as enlargement, reduction, rotation, movement, edge emphasis, thinning-out, interpolation, color conversion, and conversion of image aspect ratio, but also image editing such as synthesis, erasure, coupling, replacement, and inset. Although not especially specified in the description of this Example, there may also be provided a circuit dedicated for processing and editing of voice information, as well as the above-explained circuits for image processing and editing.

Accordingly, even a single unit of the present display device can have various functions as a display for TV broad-casting, a terminal for TV conferences, an image editor handling still and motion pictures, a computer terminal, an office automation terminal including a word processor, a game machine and so on; hence it can be applied to very wide industrial and domestic fields.

It is needless to say that FIG. 9 only shows one example of the configuration of the display device using the display panel according to the present invention, and the invention is not limited to the illustrated configuration. For example, those circuits of the components shown in FIG. 9 which are not necessary for the intended purpose of use may be dispensed with. On the contrary, depending on the intended purpose of use, other components may be added. When the present display device is employed with, a TV telephone, it is preferable to provide, as additional components, a TV camera, an audio microphone, an illuminator, and a transmission/reception circuit including a modem.

In the present display device, particularly, the display panel according to the invention can be easily reduced in thickness and, therefore, the display device can have a smaller depth. Additionally, since the display panel can easily increase the screen size and also can provide high luminance and a superior characteristic of viewing angle, it is possible to display a more realistic and impressive image with good viewability.

Other Examples

The present invention is also applicable to any types of cold cathode devices other than surface conduction electron-emitting devices, in which the path of electrons is deviated from the direction right above or perpendicular to the electron-emitting device. One example of such other electron-emitting devices is a field-effect electron-emitting device having a pair of opposite electrodes formed on the surface of a substrate where an electron source is to be made up, as disclosed in Japanese Patent Application Laid-open No. 63-274047 filed by the assignee.

According to the spirit of the present invention, the invention is not limited to image-forming apparatus suitable for display, but may also be applied to an optical printer, which comprises a photosensitive drum, light-emitting diodes and so on as a light-emitting source in place of the light-emitting diodes. In this case, the image-forming apparatus can be employed as not only a linear light-emitting source, but also a two-dimensional light-emitting source by properly selecting a number m of row-directional wirings and a number n of column-directional wirings.

In addition, according to the spirit of the present invention, the invention is further applicable to the case where the irradiated member to which electrons emitted from the electron source are irradiated is one other than the image-forming member, such as represented by an electron microscope, for example. Thus, the present invention can also be practiced in the form of an electron beam generator without specifying a type of the irradiated member.

According to the present invention, there can be provided an image-forming apparatus wherein a shield electrode is disposed between an electron source and an image-forming member within the image-forming apparatus to prevent particles (mainly positive ions), which are accelerated to fly from the side of the image-forming member toward the electron source, from depositing on or colliding against the electron source in the main, so that deterioration of the electron source and accumulation of undesired charges can be avoided. The above arrangement is also effective to prevent charges from accumulating on other portions than the electron source. To this end, it is only required to determine the shape and position of the shield member in such a manner as to cover insulating surfaces of the other portions such as support members (spacers) which are used to provide a structure endurable against the atmospheric pressure.

Figure 27:
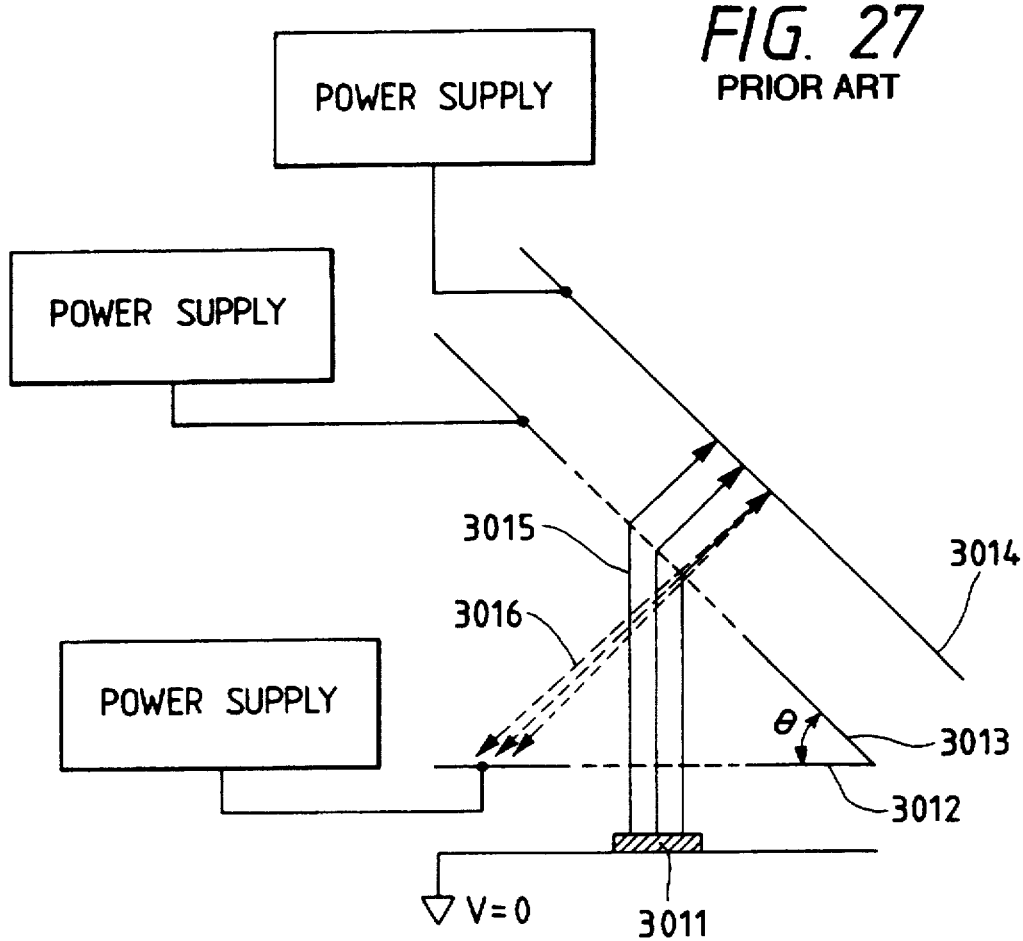
FIG. 27 is a schematic view showing construction of a prior art electron source.
Figure 28:
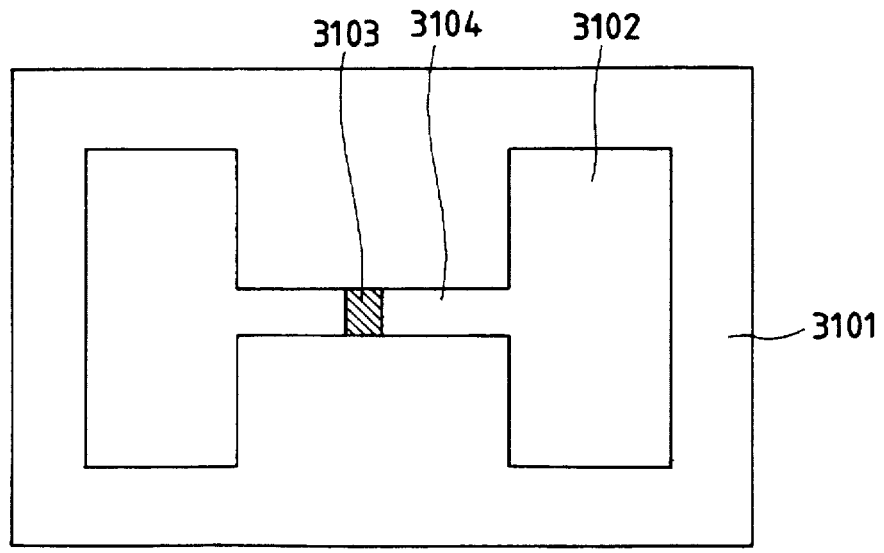
FIG. 28 is a schematic view showing construction of a prior art electron-emitting device.

In other words, with the image-forming apparatus of the present invention, since electrons emitted from the electron-emitting region of the electron-emitting device are forced to fly while deviating in the direction of an electric field developed by a pair of device electrodes with respect to the direction normal to the electron-emitting region, the electrons can travel toward the image-forming member formed of a fluorescent substance, for example, without being blocked off by the shield electrode as a shield member which covers the electron-emitting region from right above, and the electron-emitting region can be protected by the shield electrode against positive ions produced from the image-forming member. Also, even if there occurs an accidental discharge, deterioration of the electron source can be prevented. In the present invention, therefore, it is not required to additionally provide the grid, as shown in FIG. 27, for deflecting the electrons.

Accordingly, the feature of the present invention that does not require the additional complicated structure is especially suitable for an image-forming apparatus using an electron source of simple matrix array in which, as previously proposed by the applicant, pairs of opposite device electrodes of surface conduction electron-emitting devices are properly interconnected by a plurality of row-directional wirings and a plurality of column-directional wirings so that the surface conduction electron-emitting devices are arranged to lie in the row-direction and the column-direction in a matrix pattern.

What is claimed is:

1. An electron source comprising a substrate having a surface, an electron-emitting device having an electron-emitting region between a higher potential electrode and a lower potential electrode disposed side by side on said surface, and a shield member for blocking off positive ions flying toward said electron-emitting device, said shield member having an opening for allowing electrons emitted from said electron-emitting device to pass therethrough, wherein said shield member covers the area right above said electron-emitting device, and said opening deviates from the direction normal to the electron-emitting region toward the higher potential electrode side by a distance $\delta$ (in $\mu m$) represented by the formula:

$$\delta = 2d \sqrt{(V_f/V_v)}$$

where d: height from device to opening ($\mu m$);

$V_f$: device-driving voltage applied to device (V);

$V_v$: potential difference between opening and electron-emitting region (V).

2. An electron source according to claim 1, wherein said electron-emitting device and said shield member are disposed on a substrate as a unitary structure.

3. An electron source according to claim 2, wherein said shield member is laminated over said electron-emitting device.

4. An electron source according to claim 1, wherein said shield member is a conductive member.

5. An electron source according to claim 4, wherein said shield member is laminated over said electron-emitting device with an insulating member therebetween.

6. An electron source according to claim 4, wherein said shield member is a member kept under a fixed potential.

7. An electron source according to claim 6, wherein said shield member is a member which generates an electric field component for changing the path of electrons emitted from said electron-emitting device.

8. An electron source according to claim 7, wherein said electric field component is an electric field component for condensing said electrons.

9. An electron source according to claim 7, wherein said electric field component is an electric field component for deflecting said electrons.

10. An electron source according to claim 1, wherein said shield member is positioned to cover an electron-emitting region of said electron-emitting device.

11. An electron source according to claim 10, wherein said shield member is positioned to cover electrodes of said electron-emitting device as well.

12. An electron source according to claim 10, wherein said shield member is positioned to cover a substrate surface as well on which said electron-emitting device is disposed.

13. An electron source according to claim 1, wherein said electron-emitting device is a surface conduction electron-emitting device.

14. An electron source according to claim 1, wherein said electron-emitting device is a field-effect electron-emitting device.

15. An electron source according to claim 1, wherein said electron source comprises a plurality of electron-emitting devices, and said shield member allows electrons emitted from said plurality of electron-emitting devices to pass therethrough, but blocks off positive ions flying toward said plurality of electron-emitting devices.

16. An electron source according to claim 15, wherein said plurality of electron-emitting devices are each connected to a row-directional wiring and a column-directional wiring, and are arranged in a matrix pattern.

17. An electron source according to claim 15, wherein said electron source comprises multiple rows of electron-emitting devices, each row including a plurality of electron-emitting devices disposed side by side in the row-direction and interconnected in parallel, and a plurality of control electrodes disposed to extend in the column-direction side by side.

18. An electron source according to claim 17, wherein said plurality of electron-emitting devices, said shield member, and said control electrodes are arranged in this order.

19. An electron source according to claim 17, wherein said plurality of electron-emitting devices, said control electrodes, and said shield member are arranged in this order.

20. An electron beam apparatus comprising a substrate having a surface, an electron-emitting device having an electron-emitting region between a higher potential electrode and a lower potential electrode disposed side by side on said surface, a shield member for blocking off positive ions flying toward said electron-emitting device, said shield member having an opening for allowing electrons emitted from said electron-emitting device to pass therethrough, and an irradiated member to which an electron beam emitted from said electron-emitting device is irradiated, wherein said shield member covers the area right above said electron-emitting device and said opening deviates from the direction normal to the electron-emitting region toward the higher potential electrode side by a distance δ (in μm) represented by the formula:

$$\delta = 2d \sqrt{(V_f/V_v)}$$

where d: height from device to opening (μm);

$V_f$: device-driving voltage applied to device (V);

$V_v$: potential difference between opening and electron-emitting region (V).

21. An electron beam apparatus according to claim 20, wherein said shield member is laminated over said electron-emitting device.

22. An electron beam apparatus according to claim 20, wherein said shield member is a conductive member.

23. An electron beam apparatus according to claim 22, wherein said shield member is laminated over said electron-emitting device with an insulating member therebetween.

24. An electron beam apparatus according to claim 22, wherein said shield member is a member kept under a fixed potential.

25. An electron beam apparatus according to claim 24, wherein said shield member is a member which generates an electric field component for changing the path of electrons emitted from said electron-emitting device.

26. An electron beam apparatus according to claim 25, wherein said electric field component is an electric field component for condensing said electrons.

27. An electron beam apparatus according to claim 25, wherein said electric field component is an electric field component for deflecting said electrons.

28. An electron beam apparatus according to claim 20, wherein said shield member is positioned to cover an electron-emitting region of said electron-emitting device.

29. An electron beam apparatus according to claim 28, wherein said shield member is positioned to cover electrodes of said electron-emitting device as well.

30. An electron beam apparatus according to claim 28, wherein said shield member is positioned to cover a substrate surface as well on which said electron-emitting device is disposed.

31. An electron beam apparatus according to claim 20, wherein said electron-emitting device is a surface conduction electron-emitting device.

32. An electron beam apparatus according to claim 20, wherein said electron-emitting device is a field-effect electron-emitting device.

33. An electron beam apparatus according to claim 20, wherein said electron beam apparatus comprises a plurality of said electron-emitting devices, and said shield member allows electrons emitted from said plurality of electron-emitting devices to pass therethrough, but blocks off positive ions flying toward said plurality of electron-emitting devices.

34. An electron beam apparatus according to claim 33, wherein said plurality of electron-emitting devices are each connected to a row-directional wiring and a column-directional wiring, and are arranged in a matrix pattern.

35. An electron beam apparatus according to claim 33, wherein said electron beam apparatus comprises multiple rows of electron-emitting devices, each row including a plurality of said electron-emitting devices disposed side by side in the row-direction and interconnected in parallel, and a plurality of control electrodes disposed to extend in the column-direction side by side.

36. An electron beam apparatus according to claim 35, wherein said plurality of electron-emitting devices, said shield member, and said control electrodes are arranged in this order.

37. An electron beam apparatus according to claim 35, wherein said plurality of electron-emitting devices, said control electrodes, and said shield member are arranged in this order.

38. An electron beam apparatus according to claim 20, wherein said irradiated member is an image-forming member.

* * * * *

UNITED STATES PATENT AND TRADEMARK OFFICE
CERTIFICATE OF CORRECTION

PATENT NO. : 5,594,296

DATED : January 14, 1997

INVENTOR(S) : HIDEAKI MITSUTAKE ET AL.          Page 1 of 2

It is certified that error appears in the above-identified patent and that said Letters Patent is hereby corrected as shown below:

On the title page, item

[56] REFERENCES CITED

Foreign Patent Documents,
"1100842     4/1989    Japan
 1283750    11/1989    Japan" should read
--1-100842    4/1989    Japan
 1-283750   11/1989    Japan-- and
"473837     3/1992    Japan" should be deleted.

Other Publications, M.I. Elinson et al.,
"Thin" should read  -- Tin--.

COLUMN 1

Line 20, "employs" should read --employ--.
Line 67, "8" should read --and--.

COLUMN 2

Line 1, "Advance" should read --Advances--.

COLUMN 6

Line 31, "electronsource" should read --electron source--.

COLUMN 7

Line 13, "partial" should read --partial view--.
Line 64, "opening" should read
         --opening and electron emitting region.--.

UNITED STATES PATENT AND TRADEMARK OFFICE
CERTIFICATE OF CORRECTION

PATENT NO. : 5,594,296
DATED : January 14, 1997
INVENTOR(S) : HIDEAKI MITSUTAKE ET AL.

Page 2 of 2

It is certified that error appears in the above-identified patent and that said Letters Patent is hereby corrected as shown below:

COLUMN 20

Line 15, "photoresist (RD-200N-41," should read -- photoresist (RD-2000N-41,--.

Signed and Sealed this

Nineteenth Day of August, 1997

Attest:

BRUCE LEHMAN

Attesting Officer

Commissioner of Patents and Trademarks